(12) United States Patent
Saiki et al.

(10) Patent No.: US 7,646,426 B2
(45) Date of Patent: Jan. 12, 2010

(54) ELECTRONIC EQUIPMENT

(75) Inventors: Jun Saiki, Osaka (JP); Miyuki Nagashima, Osaka (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 11/679,418

(22) Filed: Feb. 27, 2007

(65) Prior Publication Data
US 2007/0201195 A1 Aug. 30, 2007

(30) Foreign Application Priority Data
Feb. 28, 2006 (JP) .............................. 2006-053158

(51) Int. Cl.
*H04N 5/225* (2006.01)
(52) U.S. Cl. ................. 348/373; 348/374; 348/376
(58) Field of Classification Search ............... 348/373, 348/374, 376
See application file for complete search history.

(56) References Cited

U.S. PATENT DOCUMENTS

| | | | | |
|---|---|---|---|---|
| 5,612,732 A | * | 3/1997 | Yuyama et al. | 348/14.01 |
| 6,067,133 A | * | 5/2000 | Niibori et al. | 349/60 |
| 7,423,878 B2 | * | 9/2008 | Kim | 361/704 |
| 7,436,453 B2 | * | 10/2008 | Takahashi | 348/374 |
| 2006/0192890 A1 | * | 8/2006 | Watanabe et al. | 348/373 |

FOREIGN PATENT DOCUMENTS

JP 2005-250145 9/2005

* cited by examiner

*Primary Examiner*—James M Hannett
(74) *Attorney, Agent, or Firm*—Hamre, Schumann, Mueller & Larson, P.C.

(57) ABSTRACT

Electronic equipment according to the present invention includes a display element. The electronic equipment includes a holding frame 23 holding a display unit 22 and including an elastic piece that can be elastically deformed in a substantially planar direction of the display surface of the display unit 22, a rear unit 21 holding a holding frame 23 and including an opening that allows the display unit 22 to be visible from outside, and a front unit 24 fixed to the rear unit 21 and covering the rear surface side of the display unit 22. The holding frame 23 is held with the rear unit 21 by elastically deforming the elastic piece. With this configuration, it is possible to attach and detach a display element such as a liquid crystal panel to and from the case easily, thus simplifying the assembling process.

10 Claims, 20 Drawing Sheets

ELECTRONIC EQUIPMENT

BACKGROUND OF THE INVENTION

1. Field of the Invention

The present invention relates to electronic equipment on which a display element such as a liquid crystal panel is mounted.

2. Description of Related Art

The display apparatus disclosed in JP2005-250145A is formed by fixing a liquid crystal panel 10 into a case 14 with a double faced tape 13, as shown in FIGS. 1 and 2 of this patent document. When foreign matter such as dust enters between the liquid crystal panel 10 and the case 14 in the assembling process of such a display apparatus, it is necessary to strip off the double faced tape 13 to detach the liquid crystal panel 10 from the case 14, and remove the foreign matter.

However, with the configuration disclosed in JP2005-250145A, the operation of attaching and detaching the liquid crystal panel to and from the case is very complicated. That is, the liquid crystal panel is fixed inside the case with the double faced tape, so that the operation of detaching the liquid crystal panel from the case while stripping off the double faced tape was very complicated. Furthermore, when re-fixing the liquid crystal panel to the case after removing the foreign matter, it was necessary to position the liquid crystal panel and the double faced tape with respect to the case with high precision, which was very complicated.

SUMMARY OF THE INVENTION

It is an object of the present invention to provide electronic equipment that allows a display element such as a liquid crystal panel to be attached and detached from a case easily, thus simplifying the assembling process.

Electronic equipment according to a first aspect of the present invention includes: a display element; a holding frame that holds the display element; an elastic piece that is provided at the holding frame and can be elastically deformed in a substantially planar direction of a display surface of the display element; and a first cover that holds the holding frame and comprising an opening formed to allow the display element to be visible from outside, wherein the holding frame is held by the first cover by elastically deforming the elastic piece and engaging it with the inner surface of the first cover.

Electronic equipment according to a second aspect of the present invention includes: a display element; a holding frame including a housing portion in which the display element is housed, a first elastic piece disposed near the housing portion, and a second elastic piece disposed at a position opposed to the first elastic piece near the housing portion and including a recess; and a first cover including an opening formed to allow the display surface of the display element to be visible from outside, an engaging hole into which the first elastic piece is inserted, and a projection by which the second elastic piece is held, wherein the holding frame holding the display element and the first cover are assembled by engaging the first elastic piece with the engaging hole by insertion, and fitting the recess to the projection.

Electronic equipment according to a third aspect of the present invention includes: a display element; a holding frame that holds the display element and including an elastic piece that can be elastically deformed in a substantially planar direction of a display surface of the display element; a first cover that holds the holding frame and including an opening that allows the display element to be visible from outside; a second cover fixed to the first cover and covering the rear surface side of the display element; and an operating portion fixed to the rear surface of the first cover and disposed such that an area thereof that is operated by a user is exposed on the surface of the first cover, wherein a portion of the operating portion is sandwiched between the rear surface of the front cover and the holding frame.

According to the electronic equipment of the present invention, it is possible to attach and detach a display element such as a liquid crystal panel from a case easily, so that the assembly can be performed easily.

DETAILED DESCRIPTION OF THE INVENTION

Embodiment 1

In the following, an image pickup apparatus such as a digital still camera is described as an example of the electronic equipment according to the present invention.

[1. Configuration of Image Pickup Apparatus]

Figure 1:
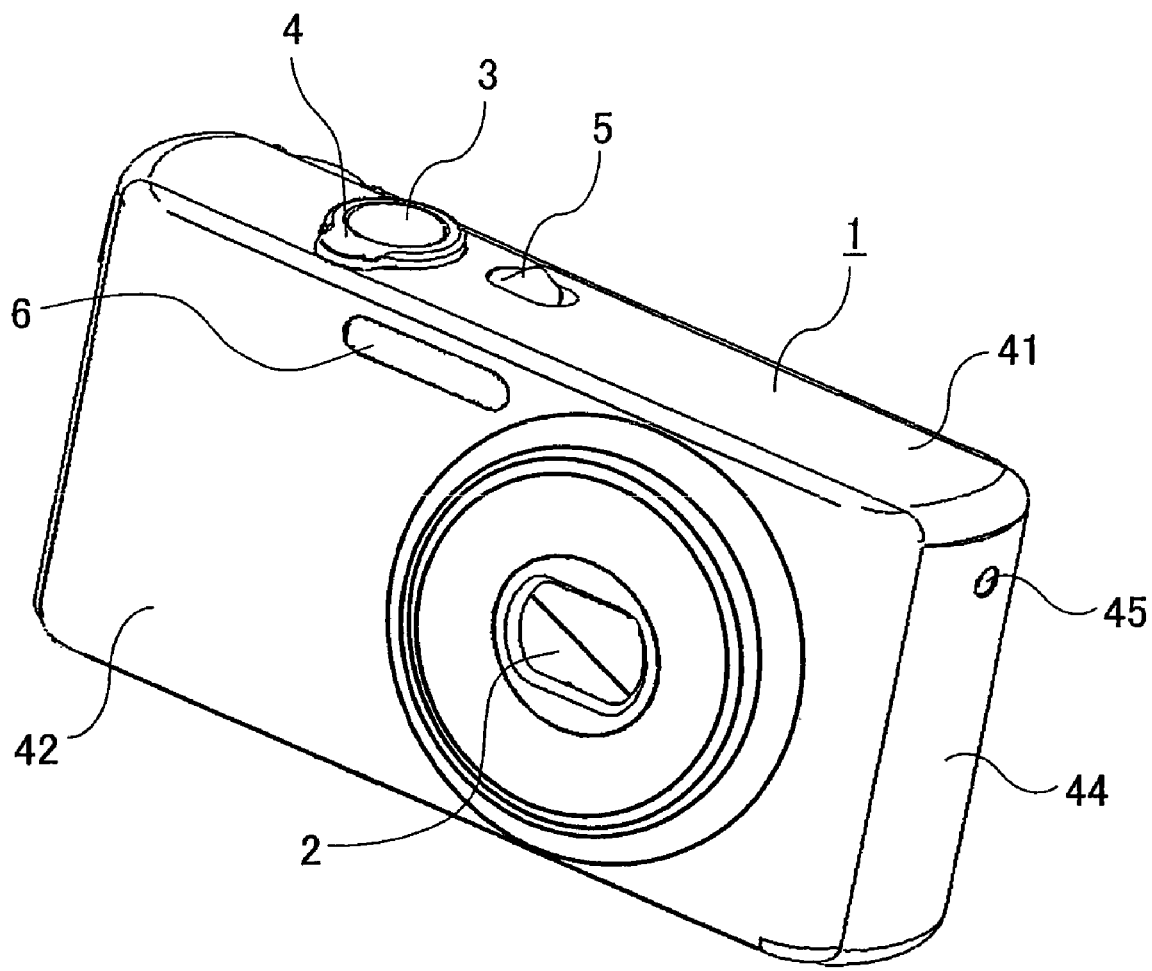
FIG. 1 is a perspective view showing the external appearance of an image pickup apparatus according to Embodiment 1.
Figure 2:
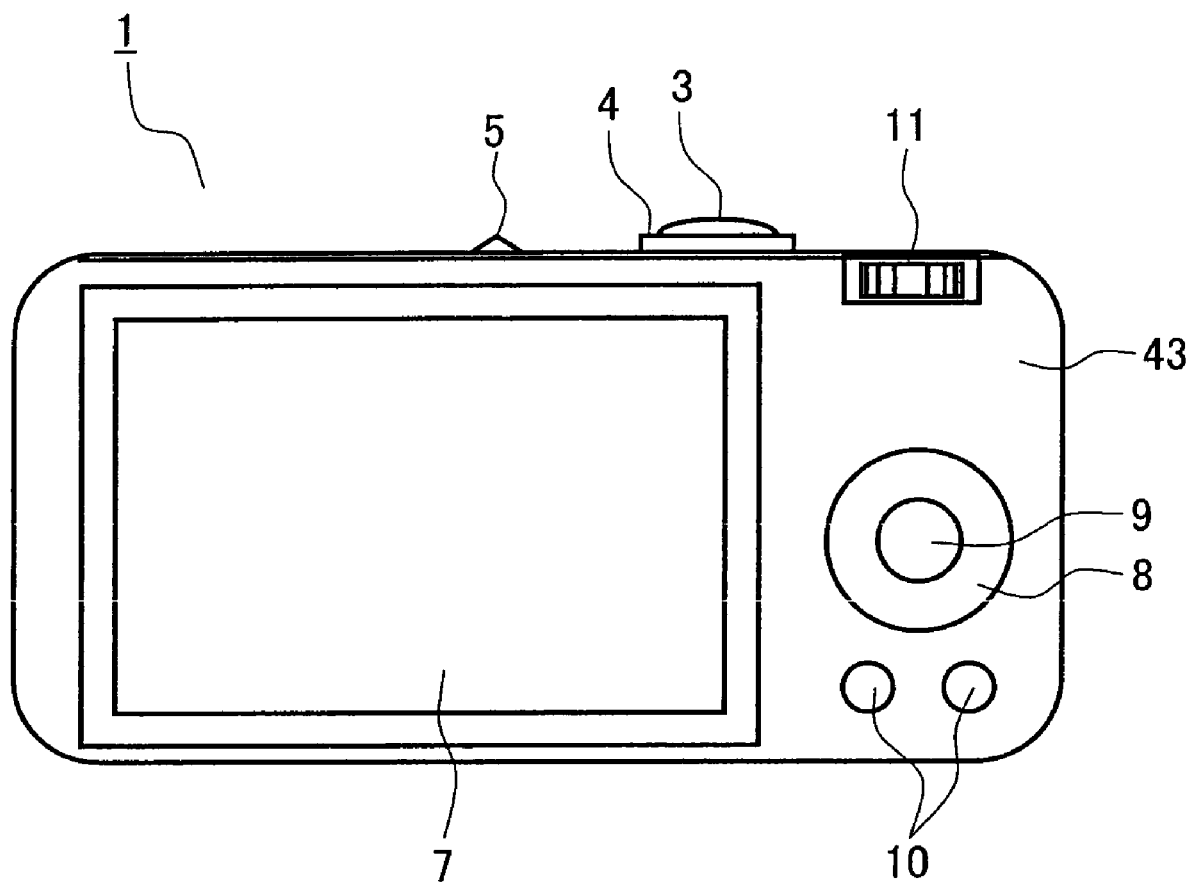
FIG. 2 is a front view of the image pickup apparatus.
Figure 3:
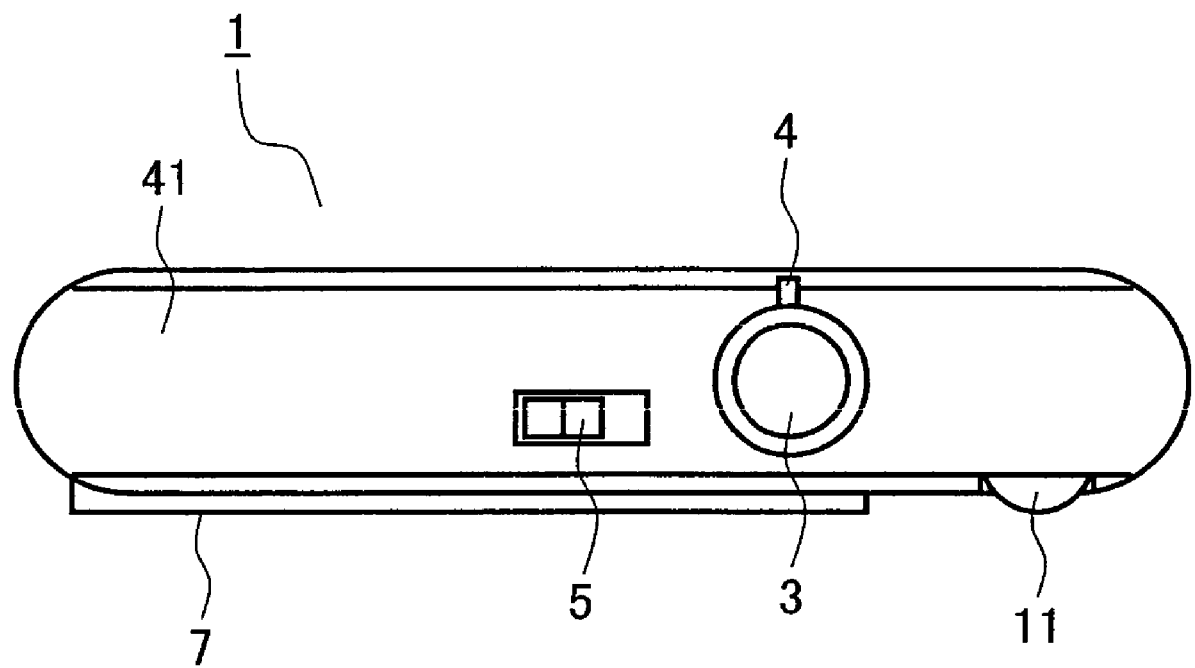
FIG. 3 is a top view of the image pickup apparatus.

FIG. 1 is a perspective view showing the external configuration of the image pickup apparatus. FIG. 2 is a side view of the image pickup apparatus, showing the surface on which a display portion is mounted in the image pickup apparatus (hereinafter, referred to as "rear surface"). FIG. 3 is a top view of the image pickup apparatus, showing the surface on which a release button and so on are disposed in the image pickup apparatus (hereinafter, referred to as "top surface").

As shown in FIGS. 1 to 3, the image pickup apparatus 1 includes an image pickup portion 2, a release switch 3, a zoom switch 4, a power switch 5, a flash lamp 6, a display portion 7, a cursor key 8, a button 9, buttons 10, and a mode dial 11. The image pickup portion 2 and the flash lamp 6 are disposed at the front surface (the surface on the photographic subject side). The release switch 3, the zoom switch 4 and the power switch 5 are disposed on the top surface. The display portion 7, the cursor key 8, the buttons 9 and 10, and the mode dial 11 are disposed on the rear surface.

As shown in FIG. 1, the image pickup portion 2 contains, for example, a lens portion constituted by a focus lens, a zoom lens or the like, and an image pickup element that captures an optical image entering through the lens portion and outputs an electric signal (image signal).

When pressed by a user, the release switch 3 allows an electric signal being picked up by the image pickup element to be captured as a image signal.

The zoom switch 4 is disposed substantially coaxially with respect to the release switch 3, and rotatably placed on the circumference of the release switch 3. By rotating the zoom switch 4, it is possible to move the zoom lens in the image pickup portion 2 towards the optical axis to scale up or down the optical image formed in the image pickup element. It should be noted that the zoom operation includes not only optical zoom in which the zoom lens is moved, but also electronic zoom in which an image signal is scaled up or down by signal processing.

The power switch 5 is constituted by a slide switch, and can be operated to turn the power on when slid in one direction, and to turn the power off when slid in the opposite direction.

The flash lamp 6 can flash simultaneously with the operation of the release switch 3. The flashing of the flash lamp 6 can be switched between ON/OFF according to a given setting in the image pickup apparatus 1.

As shown in FIG. 2, the display portion 7 (display element) can display, for example, an image being captured (a so-called through image), a menu screen, and various kinds of information such as the remaining battery power, the current date and time, and the number of remaining shots. Although the display portion 7 is constituted by a liquid crystal panel in this embodiment, it may be constituted by an organic electroluminescence element or another display element. It should be noted that the method of fixing the display portion 7 to the image pickup apparatus 1 will be described in detail later. The display portion 7 and the image pickup portion 2 are disposed on opposed side surfaces of the image pickup apparatus 1.

The cursor key 8 can be operated to provide upward, downward, leftward and rightward indications, and a predetermined function is assigned to each of the upward, downward, leftward and rightward operating portions. Examples of the assigned functions include ON/OFF switching of flashing of the flash lamp 6, ON/OFF switching of a self-timer function, and setting of bracket shooting. When a menu screen is displayed on the display portion 7, the cursor key 8 also can be operated to move a cursor displayed on the screen in a desired direction.

The button 9 is disposed at the center of the cursor key 8, and can be operated mainly to perform a "SET" operation.

The buttons 10 allow, for example, switching between ON/OFF of display of the above-described various kinds of information displayed on the display portion 7, or they may be assigned various other functions. Although two buttons 10 are provided in this embodiment, the number of the buttons 10 is not limited to this.

The mode dial 11 is rotatably disposed near the top surface of the image pickup apparatus 1, and enables mode setting of the image pickup apparatus 1. Examples of the modes that can be set include a normal shooting mode in which a still image can be captured, a high-speed shooting mode suited for capturing an object that is moving fast, a close-up mode suited for capturing an object at a close distance, and a playback mode in which an image recorded on an information medium can be displayed on the display portion 7.

The image pickup apparatus 1 is enclosed mainly with a top cover 41 (a third cover), a front cover 42 (a second cover), a rear cover 43 (a first cover) and side covers 44. One of the pair of side covers 44 is formed into a shape covering a portion of the bottom surface of the image pickup apparatus 1, as well as the side surface. On the bottom surface of the image pickup apparatus 1, a battery door (not shown) for covering a battery housing portion is provided. Thus, the bottom surface of the image pickup apparatus 1 is covered by a portion of the side covers 44 and the battery door. The general outline of the assembly of the covers is as follows. For a unit formed by joining a camera unit 25 and an electric circuit unit 26, the top cover 41 is attached to the top surface, the front cover 42 is attached to the front surface (the surface on which an object lens is disposed), the rear cover 43 is attached to the rear surface (the surface opposed to the front surface), and the side covers 44 are attached to the left and right side surfaces. During assembly, the top cover 41, the front cover 42 and the side covers 44 are fastened together with a screw 45.

[2. Internal Structure of Image Pickup Apparatus 1]

[2-1. Overall Configuration]

Figure 4:
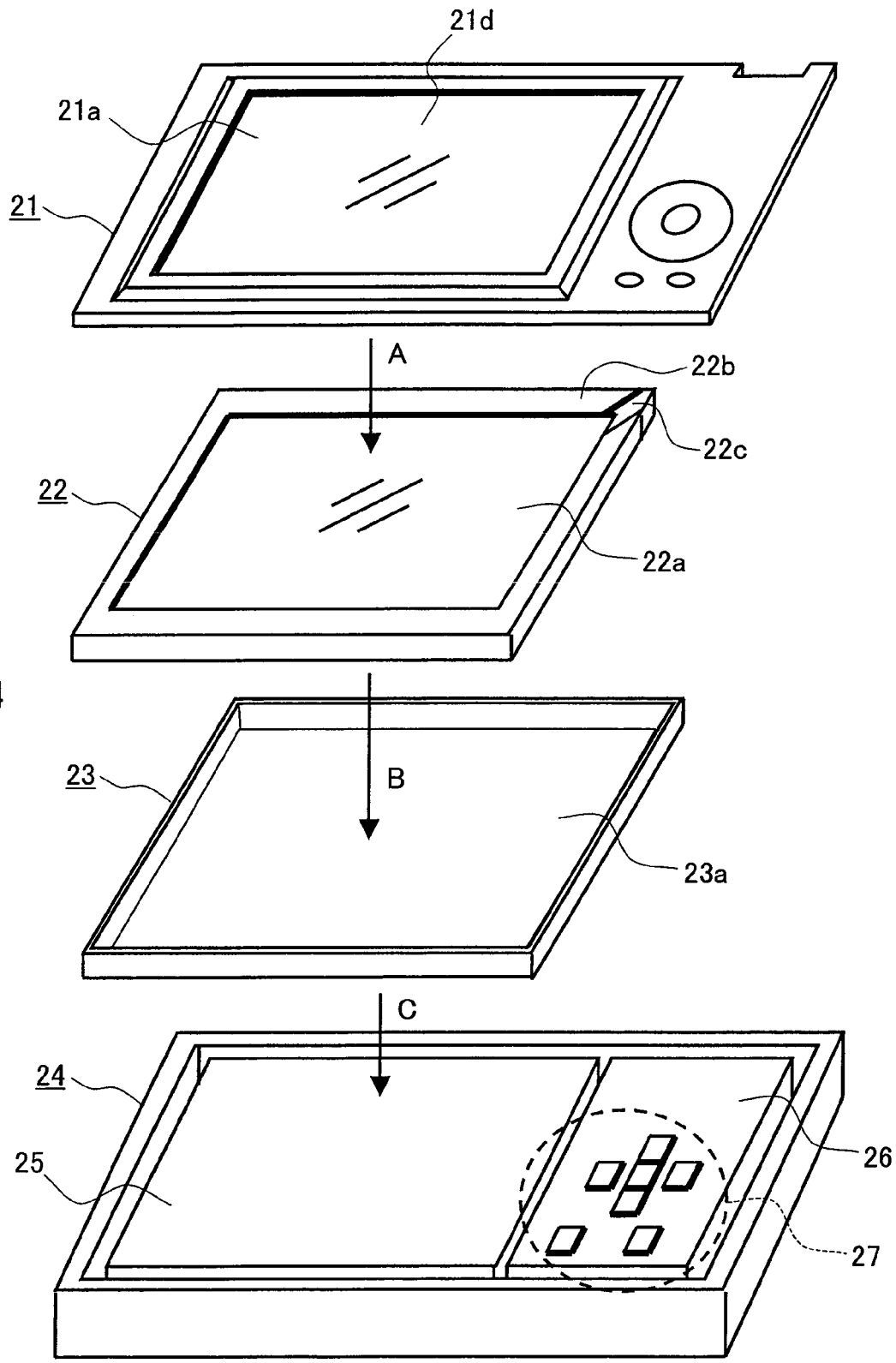
FIG. 4 is an exploded perspective view of the image pickup apparatus.

FIG. 4 is an exploded perspective view schematically showing the structure of the image pickup apparatus 1. For the convenience of description, the components and units shown in FIG. 4 are not depicted in detail, but are shown schematically.

In FIG. 4, a rear unit 21 covers the rear surface of the image pickup apparatus 1, and the cursor key 8, the buttons 9 and 10, and so on are disposed on the rear unit 21. An opening 21a, which is closed by a transparent plate 21d, is formed on the main surface of the rear unit 21. The area of the opening 21a is substantially the same as the effective display area of the display portion 7 (or a display unit 22).

The display unit 22 is constituted, for example, by a liquid crystal display panel, and includes a display area 22a on its main surface. An elastic member 22b having a certain degree of thickness is fixed to the outer peripheral edge of the display panel. The elastic member 22b is not disposed at the entire outer peripheral edge of the display unit 22, and has a notch 22c.

A holding frame 23 is constituted, for example, by sheet metal, and includes a housing portion 23a within which at least the display unit 22 can be disposed.

The front unit 24 (the second cover) is attached to the camera unit 25 and the electric circuit unit 26 such that it covers the surface of the camera unit 25 on the object lens side. Mainly, the camera unit 25 contains the above-described image pickup portion 2. The electric circuit unit 26 contains a removable battery, and also includes a power supply circuit.

Switches 27 are provided on the top surface of the electric circuit unit 26. The switches 27 are pressed by the rear surfaces of the cursor key 8, and the buttons 9 and 10 when the cursor key 8, the buttons 9 and 10 are pressed by a user. That is, the switches 27 are configured such that, when the cursor key 8, the buttons 9 and 10 are operated by the user, the key and the like press against the switches 27 to drive the circuit inside.

The image pickup apparatus 1 is formed by housing the display unit 22 held by the holding frame 23 in a case made up of the rear unit 21 and the front unit 24. After housing, the display area 22a of the display unit 22 is disposed such that it overlaps the opening 21a of the rear unit 21, and image or information displayed on the display area 22a is visible from the outside.

Next, the configuration of the various units shown in FIG. 4 is described in detail.

[2-2. Configuration of Display Unit 22]

Figure 5A:
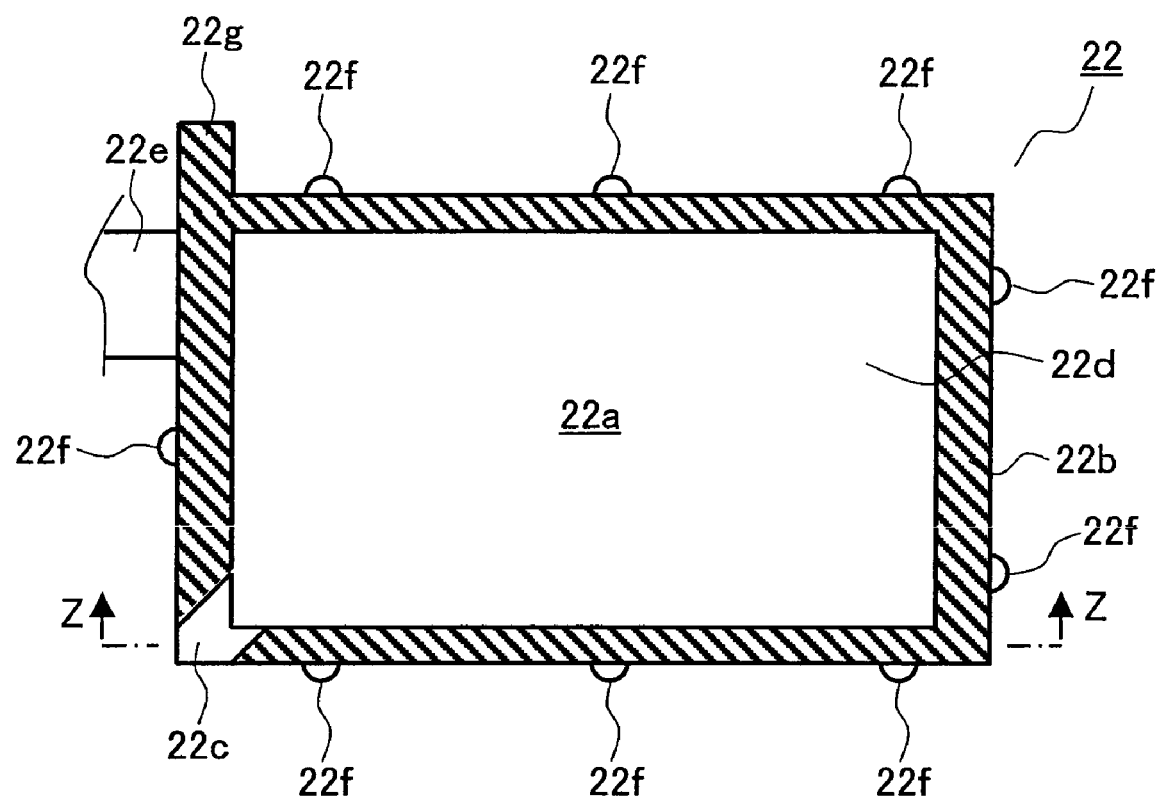
FIG. 5A is a top view of the display unit.
Figure 5B:
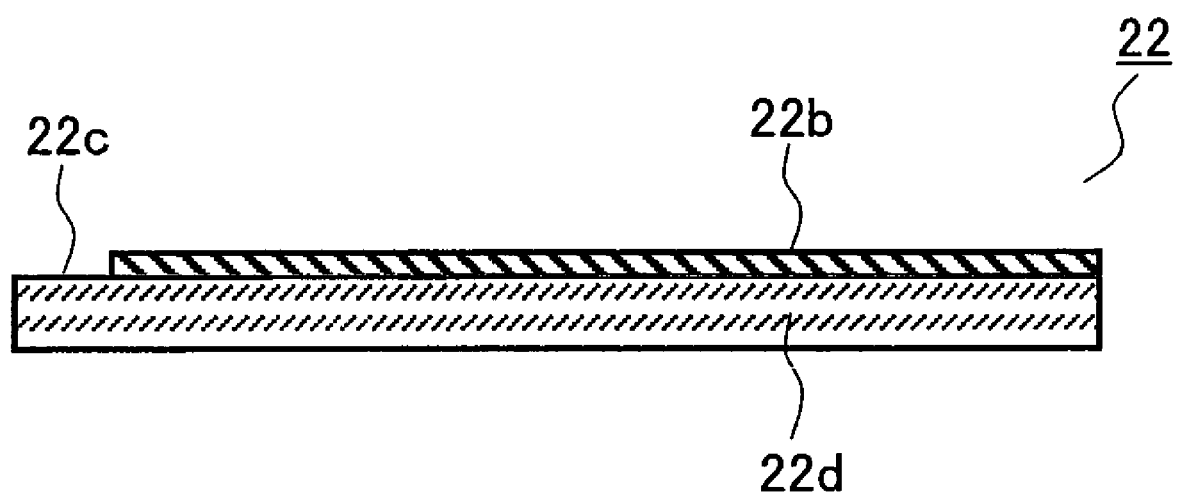
FIG. 5B is a cross-sectional view of the display unit.

FIG. 5A is a top view showing the configuration of the display unit 22. FIG. 5B is a cross-sectional view taken along the arrows Z-Z in FIG. 5A.

As shown in FIGS. 5A and 5B, the display area 22a that can display image and various kinds of information is disposed at substantially the center of the main surface of a display panel 22d. A non-display area that cannot display image and the like is present at the outer peripheral edge of the display panel 22d. The elastic member 22b is disposed at the non-display area. The elastic member 22b has a certain degree of thickness, and is made of an elastically deformable material.

When the display unit 22 is assembled into the image pickup apparatus 1, the elastic member 22b is compressed by being sandwiched between the display panel 22d and the inner side of the rear unit 21. This reduces entry of foreign matter such as dust into the display area 22a. In addition, the elastic member 22b is attached to the display panel 22d with a double faced tape, an adhesive or the like.

The elastic member 22b is not continuously disposed on the outer periphery of the display panel 22d, and includes a notch 22c. By forming the notch 22c, the space between the display unit 22 and the rear unit 21 can be in communication with the outside air.

That is, if the elastic member 22b is attached continuously at the entire outer peripheral edge of the display area 22a, then the space surrounded by the transparent plate 21d, the display area 22a and the elastic member 22b become sealed when the rear unit 21 and the display unit 22 are assembled. When the above-described space is kept sealed, there will be an air pressure difference to the outside air due to pressure changes in the usage environment of the image pickup apparatus, thereby possibly deforming the transparent plate 21d or the display panel 22d. According to this embodiment, by forming the notch 22c, there will be no air pressure difference relative to the outside air even if air pressure changes occur during use. Accordingly, it is possible to prevent deformation of the transparent plate 21d or the display panel 22d.

In addition, a flexible board 22e electrically connected to another electric circuit is disposed at a side end portion of the display panel 22d.

Further, three dowels 22f are disposed at each of the top and bottom surfaces of the display panel 22d. Dowels 22f are also disposed on the side surfaces of the display panel 22d. When fitted to holes 23h of the holding frame 23, which will be described later, the dowels 22f allow the display unit 22 to be held by the holding frame 23.

[2-3. Configuration of Holding Frame 23]

Figure 6:
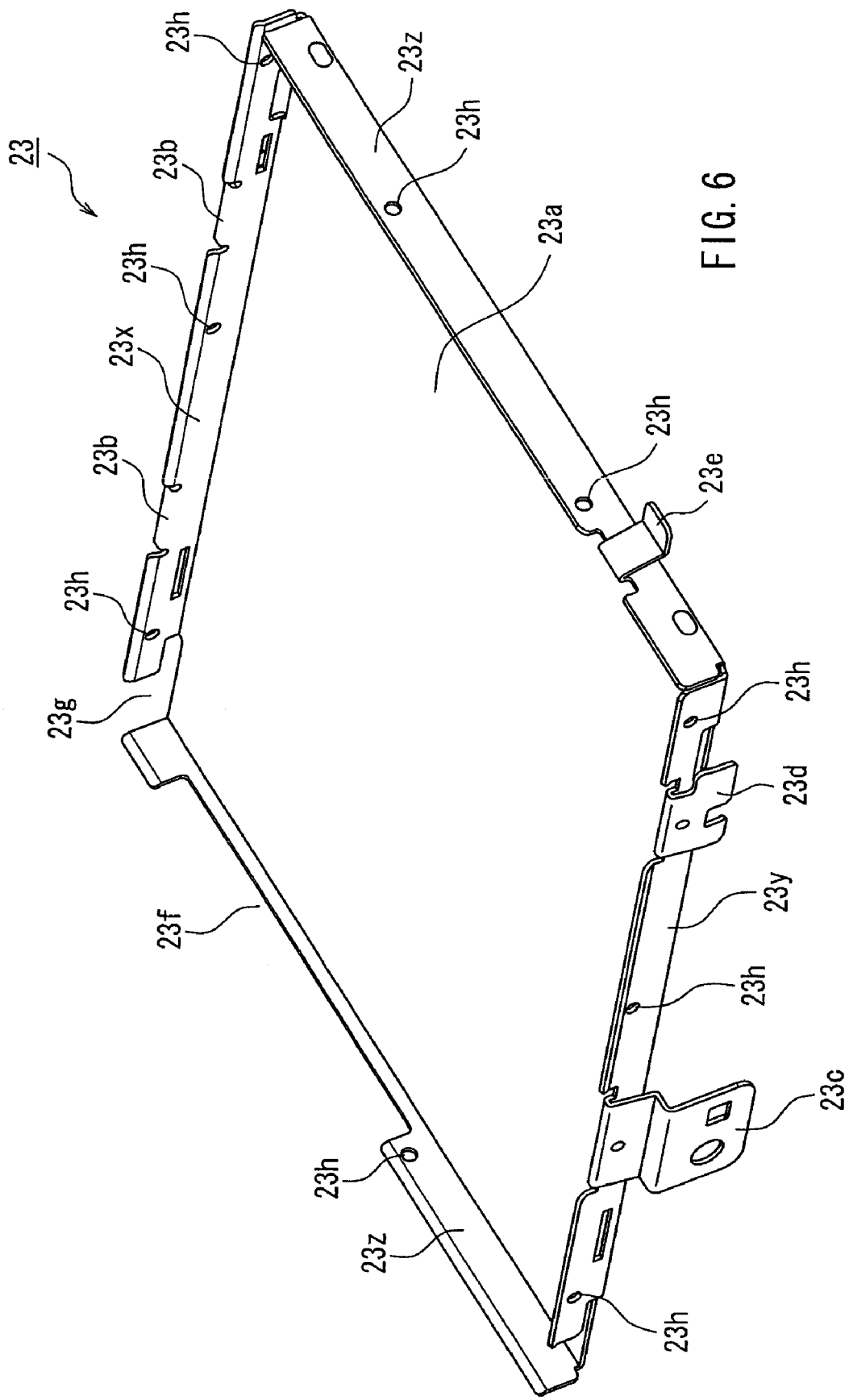
FIG. 6 is a top view of the holding frame.
Figure 7A:
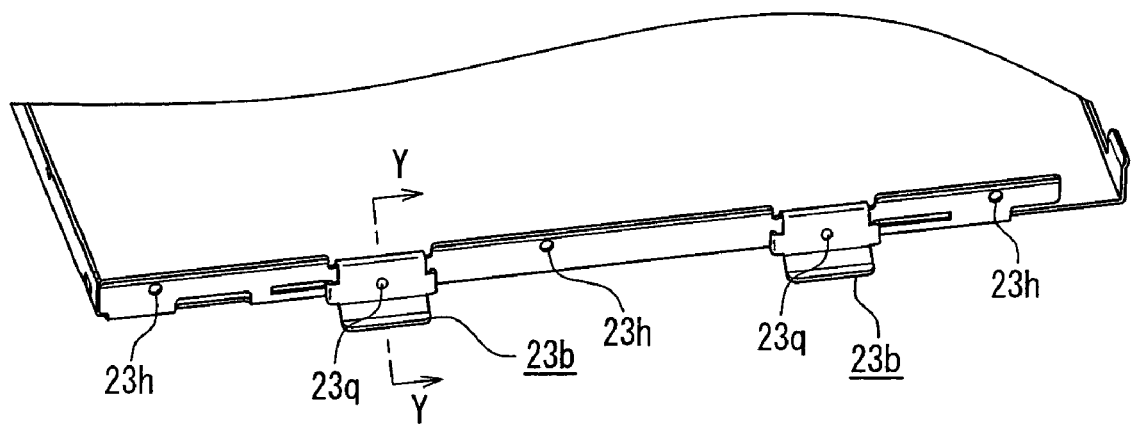
FIG. 7A is a perspective view showing a relevant part of the holding frame on the top surface side.
Figure 7B:
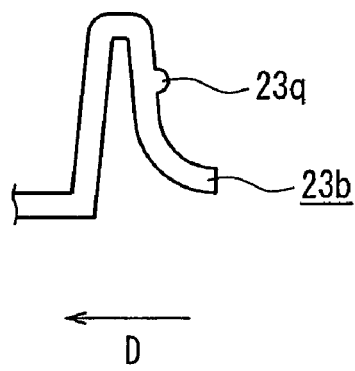
FIG. 7B is a cross-sectional view showing a relevant part of the holding frame.
Figure 8:
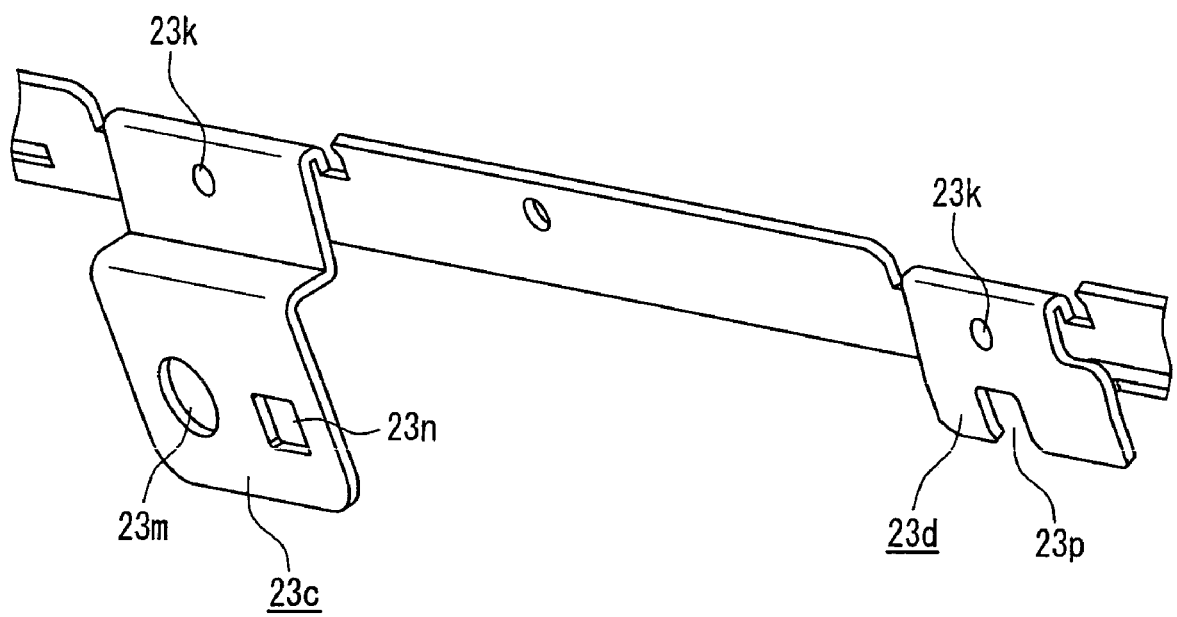
FIG. 8 is a perspective view showing a relevant part of the holding frame on the bottom surface side.

FIG. 6 is a perspective view showing the configuration of the holding frame 23. FIG. 7A is a perspective view showing a relevant part of the holding frame 23 on the top surface side. FIG. 7B is a cross-sectional view showing a relevant part of the Y-Y portion in FIG. 7A. FIG. 8 is a perspective view showing a relevant part of the holding frame 23 on the bottom surface side.

In FIG. 6, the housing portion 23a has a bottom, and the outer edge of the bottom is surrounded by longitudinal walls in four directions, providing a space in which the display unit 22 (see FIG. 4) can be housed. The longitudinal walls are constituted by an upper wall 23x facing the top surface of the display unit 22 housed in the housing portion 23a, a lower wall 23y opposed to the upper wall 23x and facing the bottom surface of the display unit 22, and a pair of side walls 23z facing the two side surfaces of display unit 22.

Two positioning pieces 23b (first elastic pieces), an opening 23g, and three engaging holes 23h are formed in the upper wall 23x. Elastic pieces 23c (a second elastic piece) and 23d, and three engaging holes 23h are formed in the lower wall 23y. An opening 23f, a pressing portion 23e, and engaging holes 23h are formed in the side walls 23z.

When the holding frame 23 is held by the rear unit 21, the pressing portion 23e presses against a portion of the operating portion, which will be described in detail later, disposed in the rear unit 21, thus causing the operating portion to be held with the rear unit 21.

The opening 23f is provided for disposing the flexible board 22e (see FIG. 5) disposed in the display unit 22 by drawing it out from the holding frame 23.

The positioning pieces 23b are inserted into engaging holes 21b provided in the rear unit 21 (see FIG. 4), thus causing the holding frame 23 to be held with the rear unit 21.

Three engaging holes 23h are formed in the upper wall 23x with a predetermined interval, and engaged with the dowels 22f disposed on the upper side of the display unit 22, among the dowel 22fs disposed on the display unit 22. By engaging the engaging holes 23h with the dowels 22f, the display unit 22 can be held with the holding frame 23.

Each of the positioning pieces 23b is provided with a projection 23q. When causing the holding frame 23 to be held with the rear unit 21, the projection 23q comes into contact with the inner surface of the rear unit 21, thus temporarily fixing and positioning the holding frame 23 to the rear unit 21. In this embodiment, the projection 23q is formed by press forming. However, it may be formed by other methods. Further, although the shape of the projection 23q is that of a hemisphere, it may be formed in other shapes such as a cone.

As shown in FIG. 8, the elastic piece 23c is provided with a projection 23k, a hole 23m and a recess 23n. On the other hand, the elastic piece 23d is provided with a projection 23k and a recess 23p.

When causing the holding frame 23 to be held with the rear unit 21, the projection 23k comes into contact with the inner surface of the rear unit 21, thus temporarily fixing and positioning the holding frame 23 to the rear unit 21. In this embodiment, the projection 23k is formed by press forming. However, it may be formed by other methods. Further, although the shape of the projection 23k is that of a hemisphere, it may be formed in other shapes such as a cone.

The hole 23m is a hole through which a screw is inserted when fixing the holding frame 23 to the rear unit 21 with that screw.

The projections provided on the inner side of the rear unit 21 are respectively fitted to the recesses 23n and 23p, thus positioning the holding frame 23 with respect to the rear unit 21.

[2-4. Configuration of Rear Unit 21]

Figure 9A:
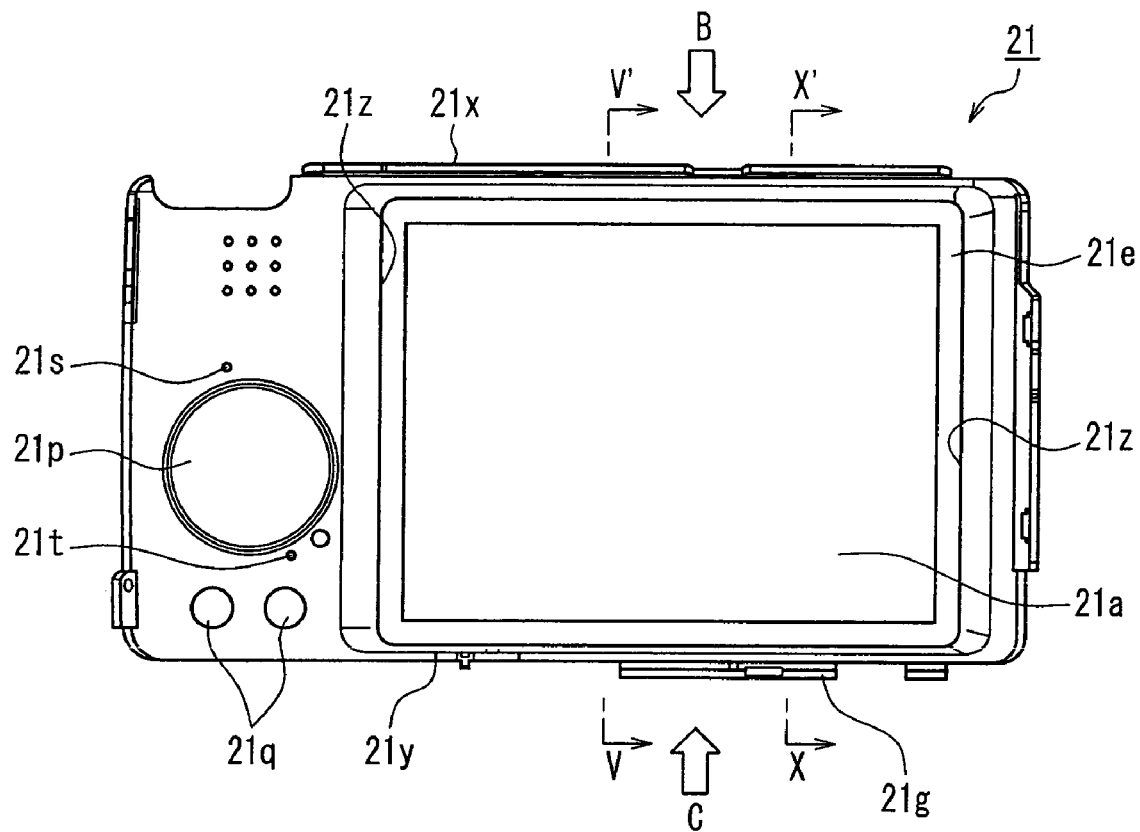
FIG. 9A is a front view showing the internal configuration of the rear unit.
Figure 9B:
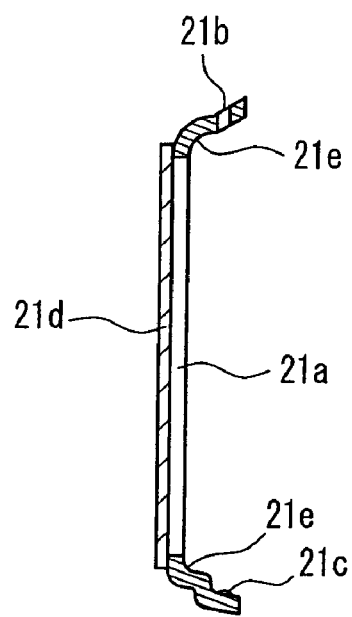
FIG. 9B is a cross-sectional view taken along the arrows X-X in FIG. 9A.
Figure 9C:
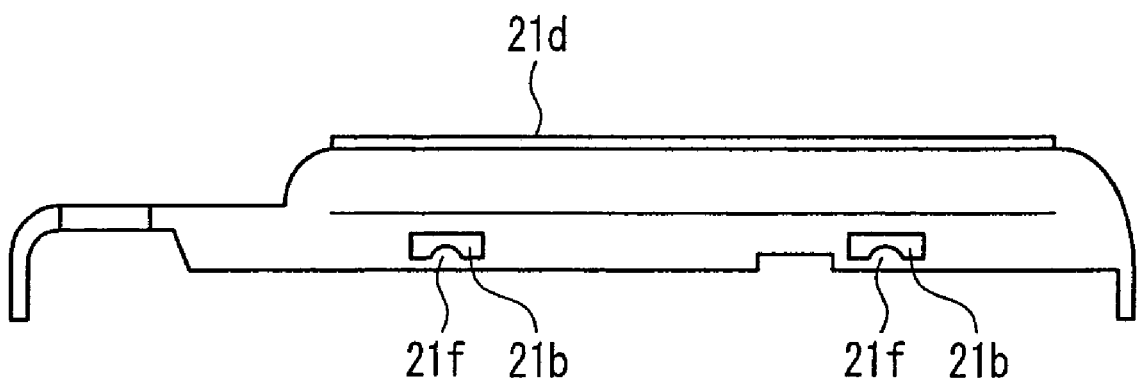
FIG. 9C is a top view taken from the direction of the arrow B in FIG. 9A.
Figure 9D:
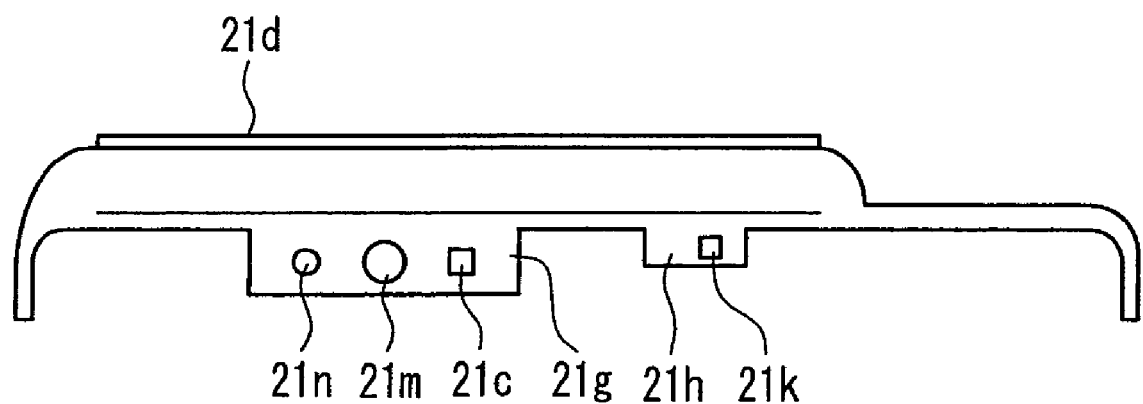
FIG. 9D is a top view taken from the direction of the arrow C in FIG. 9A.

FIG. 9A is a top view of the rear unit 21, showing its inner structure. FIG. 9B is a cross-sectional view taken along the arrows X-X in the FIG. 9A. FIG. 9C is a top view from the direction of the arrow B in FIG. 9A, taken from the top surface side of the image pickup apparatus 1. FIG. 9D is a top view from the direction of the arrow C in FIG. 9A, taken from the bottom surface side of the image pickup apparatus 1.

In FIG. 9A, the rear unit 21 is provided with a recess on the inner side of which the display unit 22 and so on can be disposed. The opening 21a is formed on the bottom surface of that recess. A contact surface 21e, with which the elastic member 22b comes in contact when the display unit 22 is housed in the recess, is disposed around the opening 21a. The recess is surrounded by an upper wall 21x, a lower wall 21y, and a pair of side walls 21z. The transparent plate 21d (see FIG. 9B) is fixed such that it covers the opening 21a from outside. The transparent plate 21d is constituted by an acrylic plate or the like, and disposed for protecting the display area 22a of the display unit 22 from scratching, impact and so on.

An opening 21p for disposing the cursor key 8 and the button 9 such that they are exposed on the surface side of the rear unit 21, and opening 21q for disposing the buttons 10 such that they are exposed on the surface side of the rear unit 21, are formed beside the recess.

Pins 21s and 21t for positioning the cursor key 8 are disposed in the area surrounding the opening 21p.

As shown in FIGS. 9B and 9C, two engaging holes 21b are formed in the upper wall 21x. The positioning pieces 23b of the holding frame 23 are engaged respectively with the engaging holes 21b. A projection 21f is formed in each of the engaging holes 21b. When the positioning piece 23b is engaged with the engaging hole 21b, the projection 21f comes in contact with the surface of the positioning piece 23b, thus performing positioning. This makes it possible to position the upper portion of the holding frame 23 with respect to the upper portion of the rear unit 21.

As shown in FIGS. 9A and 9D, ribs 21g and 21h are formed in the lower wall 21y. A projection 21c, and holes 21m and 21n are formed in the rib 21g. On the other hand, a projection 21k is formed in the rib 21h.

The projection 21c is configured such that it can be fitted to the recess 23n formed in the elastic piece 23c of the holding frame 23. The projection 21k is configured such that it can be fitted to the recess 23p formed in the elastic piece 23d. By fitting the projection 21c to the recess 23n, and fitting the projection 21k to the recess 23p, the lower portion of the holding frame 23 can be positioned with respect to the rear unit 21.

The hole 21m is a hole through which a screw is inserted when the rear unit 21 is fixed with that screw.

[2-5. Configuration of Operating Portion]

Figure 10A:
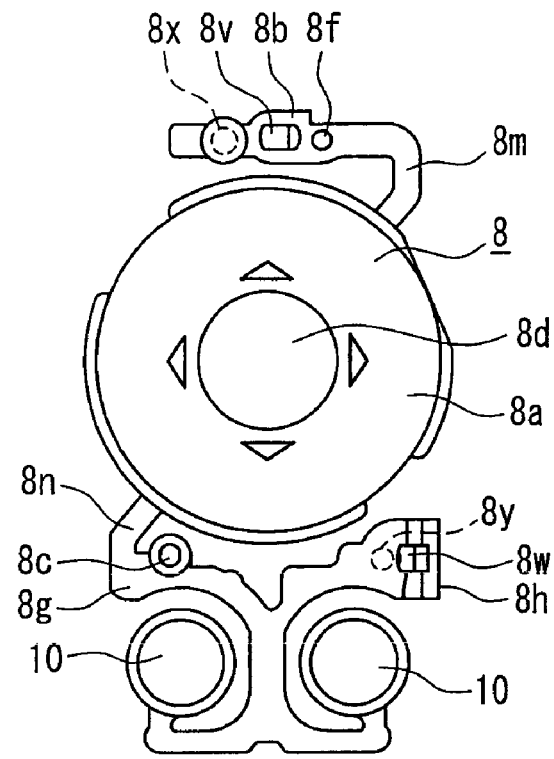
FIG. 10A is a top view showing the configuration of the cursor key on the surface side.
Figure 10B:
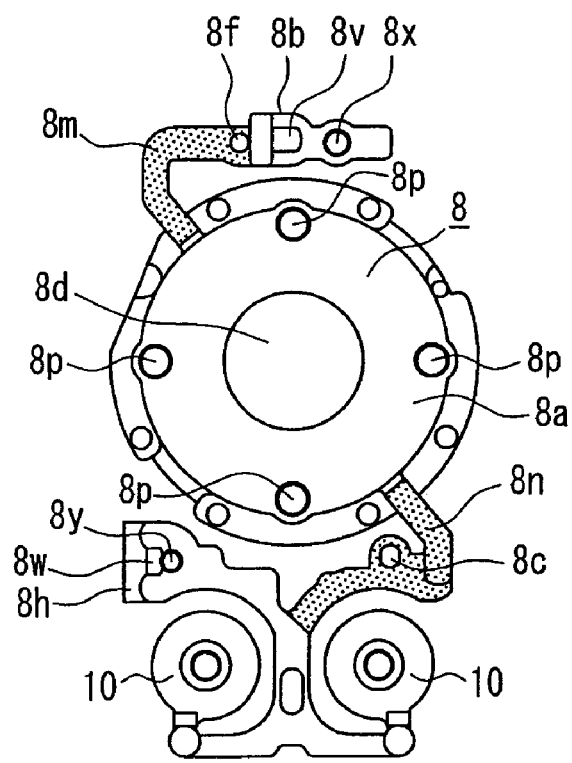
FIG. 10B is a top view showing the configuration of the cursor key on the rear surface side.
Figure 11:
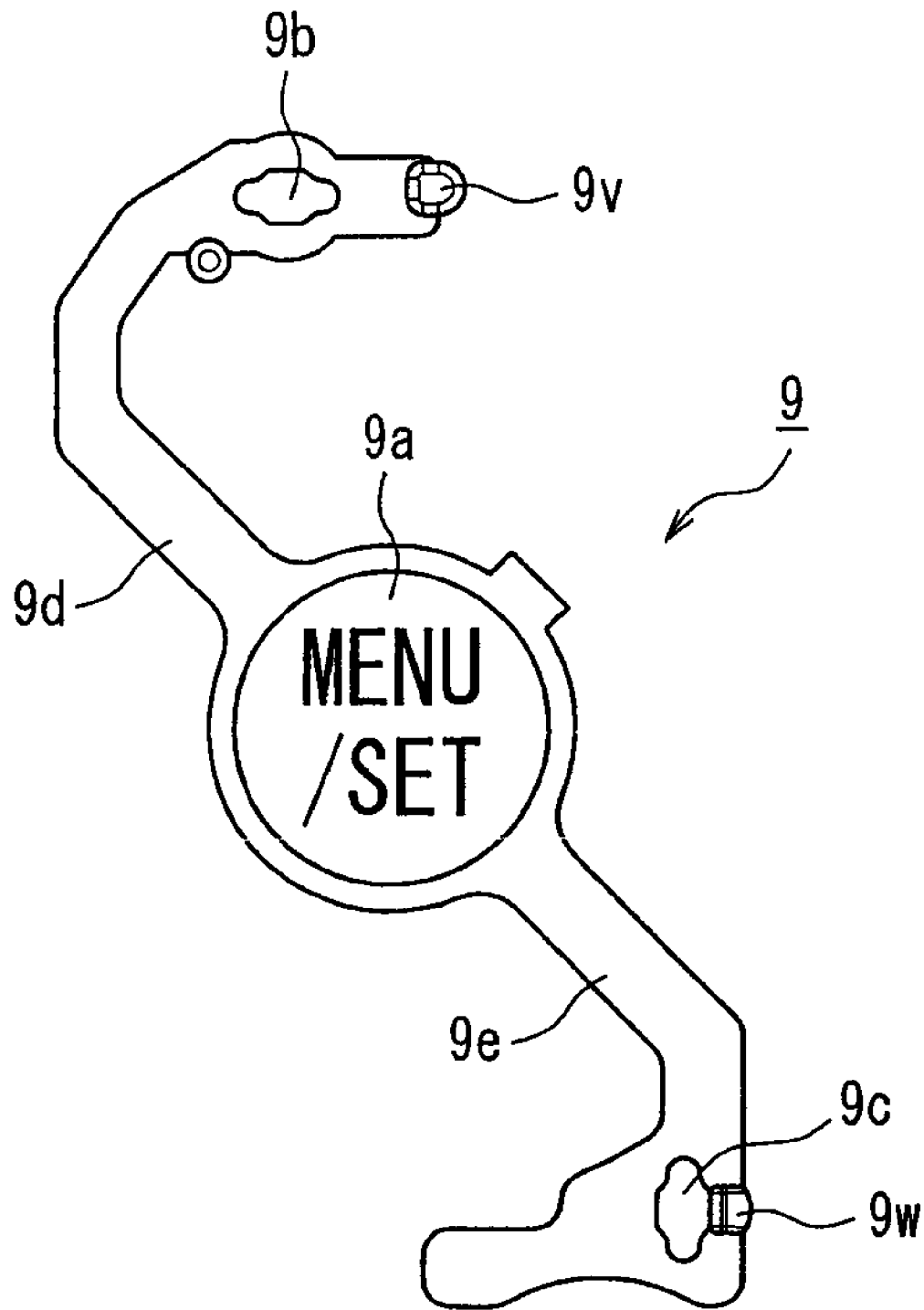
FIG. 11 is a top view showing the configuration of the set key.

FIGS. 10A and 10B are top views showing the configuration of the cursor key 8. FIG. 11 is a top view showing the configuration of the button 9. It should be noted that FIGS. 10A and 11 are views from the surface side (the operating surface side). FIG. 10B is a view from the rear surface side (the image pickup apparatus side).

As shown in FIGS. 10A and 10B, the cursor key 8 (a first operating unit) is formed by integrating in one piece an operating portion 8a (a first operating portion), supporting portions 8b and 8h, openings 8c, 8d and 8f, frames 8m and 8n (first frames) and the buttons 10. The cursor key 8 is formed by plating the surface of a base material made of ABS resin or the like. Plating is performed for at least a portion of the surface of the cursor key 8, for example, in order to decorate the base unit or to prevent corrosion thereof.

The operating portion 8a is an area that is exposed to the outside through the opening 21p of the rear unit 21, and characters, marks and the like representing predetermined functions are written on its surface (pressing portion). Triangle marks representing the upward, downward, leftward and rightward directions are written in this embodiment. However, characters or marks representing specific functions (e.g., a self-timer mark) also may be written. In addition, the cursor key 8 contained in the image pickup apparatus is operated as follows. The switches 27 (see FIG. 4) are disposed underneath the operating portion 8a, and the switches 27 are pressed by the rear surface of the operating portion 8a when the operating portion 8a is operated by the user.

As shown in FIG. 10B, pins 8x and 8y are arranged standing upright on the rear surface of the cursor key 8. Furthermore, long holes 9b and 9c of the button 9 are engaged with the pins 8x and 8y. Engaging holes 8v and 8w are engaged with the projections 9v and 9w of the button 9. Thus, the button 9 can be held on the cursor key 8.

The openings 8c and 8f are formed in opposed positions, with the operating portion 8a disposed therebetween, and engaged respectively with the pin 21s and 21t formed in the rear unit 21, thus being positioned.

An opening 8d is for provided for exposing the button 9 to the outside, and has a size that allows the user to operate at least an operating portion 9a of the button 9 with his finger.

The frames 8m and 8n are disposed at opposed positions in the operating portion 8a, and extend in opposed directions. The supporting portion 8b and the opening 8f are provided integrally with the frame 8m. The opening 8c, the buttons 10 and so on are provided integrally with the frame 8n.

In this embodiment, plating is performed on substantially the entire surface of the base material of the cursor key 8, and a non-plated portion is formed on the rear surface side of the frames 8m and 8n. In FIG. 10B, the hatched area indicates the non-plated portion, where the base material is exposed. The non-plated portion has lower rigidity than the plated portion, since it has no plating film. In this way, by forming a non-plated portion in the frames 8m and 8n, which are elastically deformed when the cursor key 8 is pressed, the frames 8m and 8n have reduced rigidity and therefore are elastically deformed easily, making it possible to improve the operability of the cursor key 8. Furthermore, by facilitating elastic deformation by omitting plating in the above-described manner, it is possible to decrease the total length of the frames 8m and 8n, while ensuring the operability. By forming shorter frames 8m and 8n, it is possible to reduce the size of the cursor key 8, and the size of the image pickup apparatus.

The frames 8m and 8n are not disposed radially of the area of the operating portion 8a that is to be operated by the user (for example, the triangle marks in FIG. 10A). In this embodiment, the frame 8m is disposed between the area of the operating portion 8a that can be operated upward and the area that can be operated rightward. The frame 8n is disposed between the area of the operating portion 8a that can be operated leftward and the area that can be operated downward. That is, when pressed by the user, the operating portion 8a is displaced mainly about the frames 8m and 8n as the axis, and, therefore, the line connecting the frames 8m and 8n is the displacement axis of the operating portion 8a.

Pins 8p are arranged standing upright at four locations, namely, the upward, downward, leftward and rightward locations on the rear surface of the operating portion 8a. Furthermore, the pins 8p are formed at positions respectively facing the plurality of buttons constituting the switches 27 (see FIG. 4). Accordingly, when the operating portion 8a is pressed, the pin 8p formed on the rear surface of the pressed portion presses at least one of the buttons of the switches 27. It should be noted that the pins 8p are not essential, since the switches 27 can be pressed by the rear surface of the operating portion 8a even if the pins 8p are not formed.

The cursor key 8 having the above-described configuration is positioned on the rear surface of the rear unit 21 by positioning the pin 21s and 21t formed on the rear unit 21 to the openings 8c and 8f. At this time, the surfaces of the frame 8m and the rib 8g come in contact with the rear surface of the rear unit 21, thus holding the cursor key 8 in the unused state substantially horizontally. The operating portion 8a is exposed to the outside through the opening 21p, and the buttons 10 are exposed to the outside through the openings 21q.

Next, as shown in FIG. 11, the button 9 (a second operating unit) includes the operating portion 9a (a second operating portion), the long holes 9b and 9c, and frames 9d and 9e (second frames).

The operating portion 9a can be moved in the upward and downward directions, and the switch 27 (see FIG. 4) disposed underneath the operating portion 9a can be operated by the user pressing the top surface of the operating portion 9a.

Figure 15:
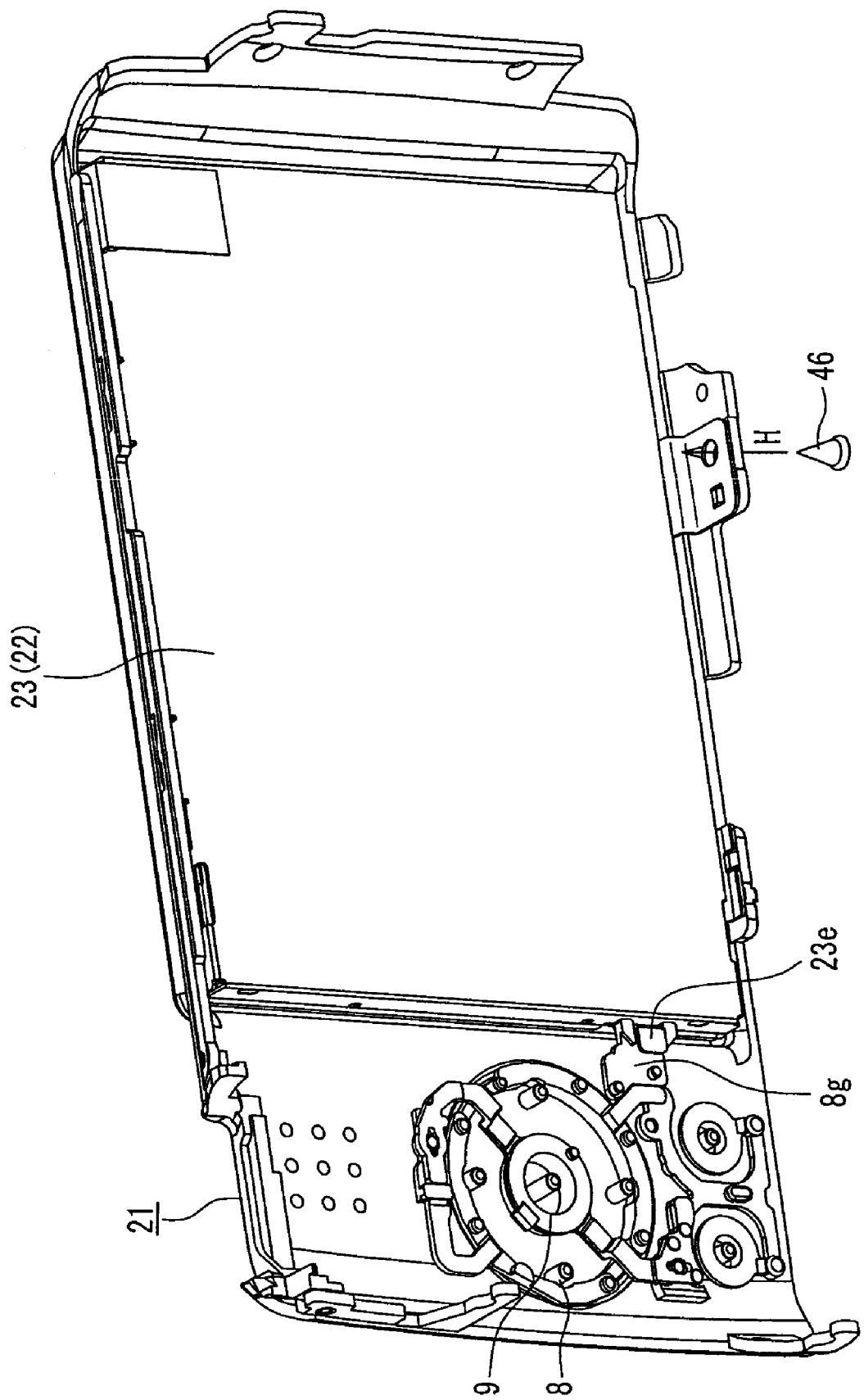
FIG. 15 is a perspective view showing the rear unit to which the holding frame and the display unit are attached.

The frames 9d and 9e are disposed at opposed positions in the operating portion 9a, and extend in opposed directions. That is, when pressed by the user, the operating portion 9a is displaced by being mainly supported by the frames 9d and 9e. The positions at which the frames 9d and 9e are disposed in the operating portion 9a are positions at which the displacement axis of the operating portion 8a and the line segment connecting the frames 9d and 9e are substantially orthogonal when the cursor key 8 and the button 9 are assembled to the rear unit 21 as shown in FIG. 15. That is, the frames 8m, 8n, 9d, and 9e are disposed at positions in point symmetry of approximately 180° in the rotation direction with respect to the central axis of the button 9 when the cursor key 8 and the button 9 are assembled as shown in FIG. 15.

The long holes 9b and 9c are formed near the tips of the frames 9d and 9e. By engaging the long holes 9b and 9c with the pins 8x and 8y formed in the cursor key 8, the button 9 is held on (temporarily fixed to) the cursor key 8. When the button 9 is held on the cursor key 8, the operating portion 9a is disposed within the opening 8d, and its operating surface is exposed to the outside. It should be noted that examples of the method of joining the long holes 9b and 9c with the pins 8x and 8y include heating either the long holes or the pins or both to weld them to one another, and bonding them together with an adhesive or the like, in addition to engaging them with one another as in this embodiment.

When joining the cursor key 8 with the button 9, first, the button 9 is disposed on the rear surface of the cursor key 8 such that the operating portion 9a is exposed through the opening 8d. Then, the engaging hole 8v and the projection 9v are engaged with each other to engage the engaging hole 8w with the projection 9w. Then, the pin 8x is engaged with the long hole 9b to engage the pin 8y with the long hole 9c. Thus, the unit of the operating portion is completed.

When the operating portion 8a of the cursor key 8 is pressed by the user in the above-described configuration, it is displaced torsionally with respect to the frames 8m and 8n. Then, the switches 27 (see FIG. 4) disposed underneath the cursor key 8 are pressed by the pins 8p formed on the rear surface of the operating portion 8a.

When the operating portion 9a of the button 9 is pressed, the button 9 is displaced in that pressing direction, and the switches 27 (see FIG. 4) are pressed by the rear surface of the operating portion 9a.

Here, the cursor key 8 and the button 9 are disposed such that the displacement axis of the operating portion 8a and the displacement axis of the operating portion 9a are substantially orthogonal to each other, and they are also disposed such that they do not overlap the triangle marks on the operating portion 8a. Accordingly, operating the operating portion 8a in any of the upward, downward, leftward and rightward directions will not cause displacement of the operating portion 9a, so that no operating error will occur. Furthermore, pressing the operating portion 9a will not cause displacement of the operating portion 8a, so that no operating error will occur.

Moreover, since the two buttons 10 are integrated separately with the frame 8n, they can be operated individually.

[3. Method for Assembling Image Pickup Apparatus]

The image pickup apparatus according to this embodiment can be assembled as shown in FIG. 4. First, the display unit 22 is attached to the holding frame 23 as indicated by the arrow B. Then, the rear unit 21 is attached to the holding frame 23 as indicated by the arrow A. Then, the rear unit 21 to which the display unit 22 and the holding frame 23 are attached is attached to the front unit 24 as indicated by the arrow C. Thus, the image pickup apparatus 1 is completed. In the following, the assembling operations of the various units are described in detail.

[3-1. Method for Attaching Display Unit 22 and Holding Frame 23]

When attaching the display unit 22 to the holding frame 23, the dowels 22f formed on the display unit 22 as shown in FIG. 5A are engaged with the engaging holes 23h formed in the holding frame 23 shown in FIG. 6 to house the display unit 22 in the housing portion 23a.

At this time, the display unit 22 and the holding frame 23 are arranged such that the flexible board 22e disposed in the display unit 22 can be drawn out from the holding frame 23 through the opening 23f.

[3-2. Method for Attaching Rear Unit 21 and Holding Frame 23]

Figure 12:
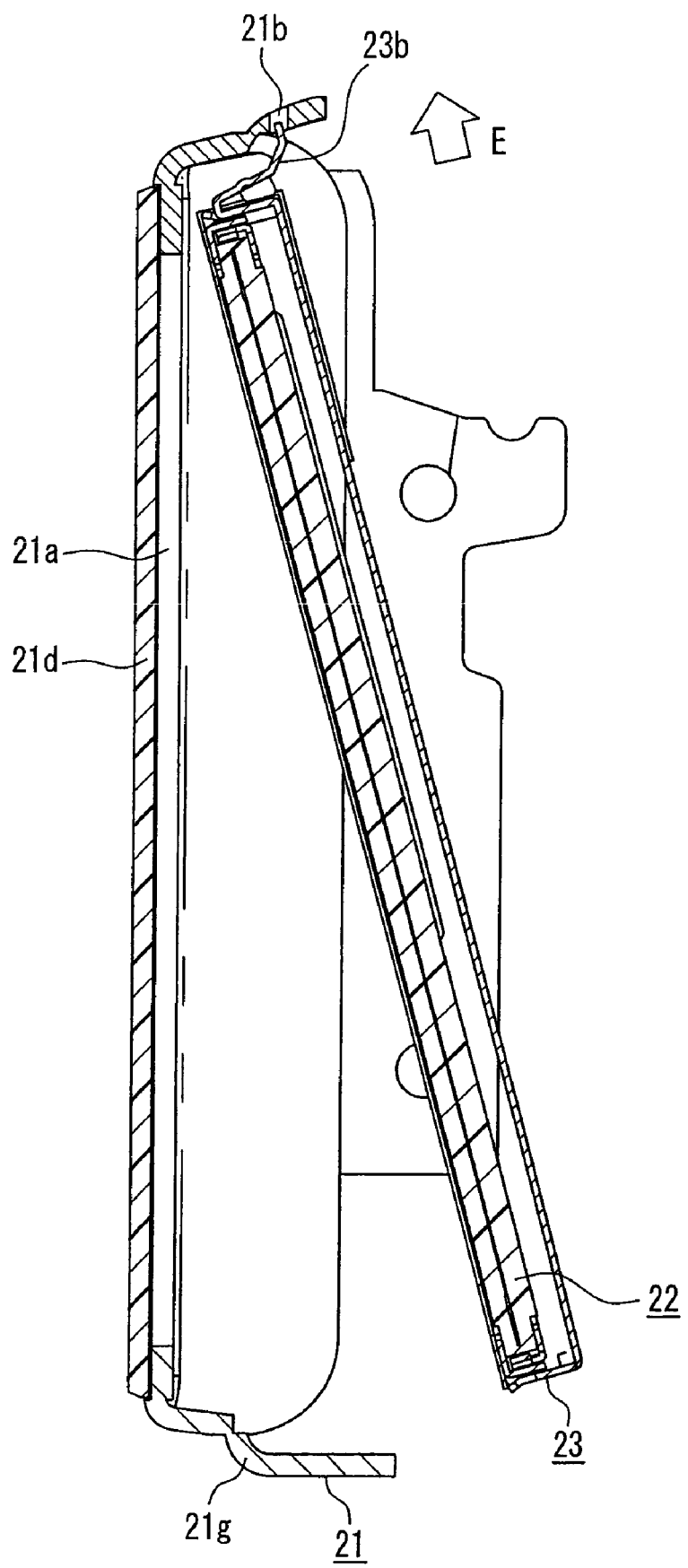
FIG. 12 is a cross-sectional view illustrating the operation of attaching the holding frame to the rear unit.
Figure 13:
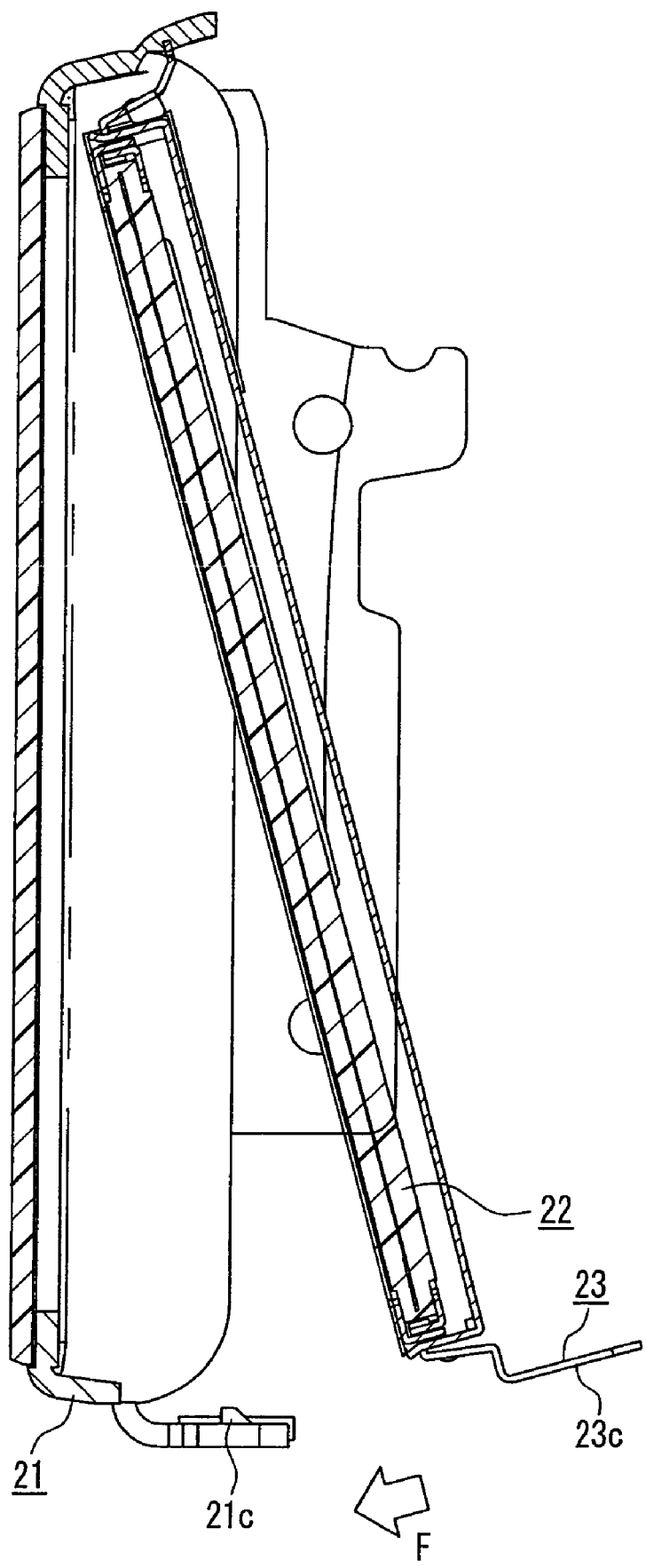
FIG. 13 is a cross-sectional view illustrating the operation of attaching the holding frame to the rear unit.
Figure 14:
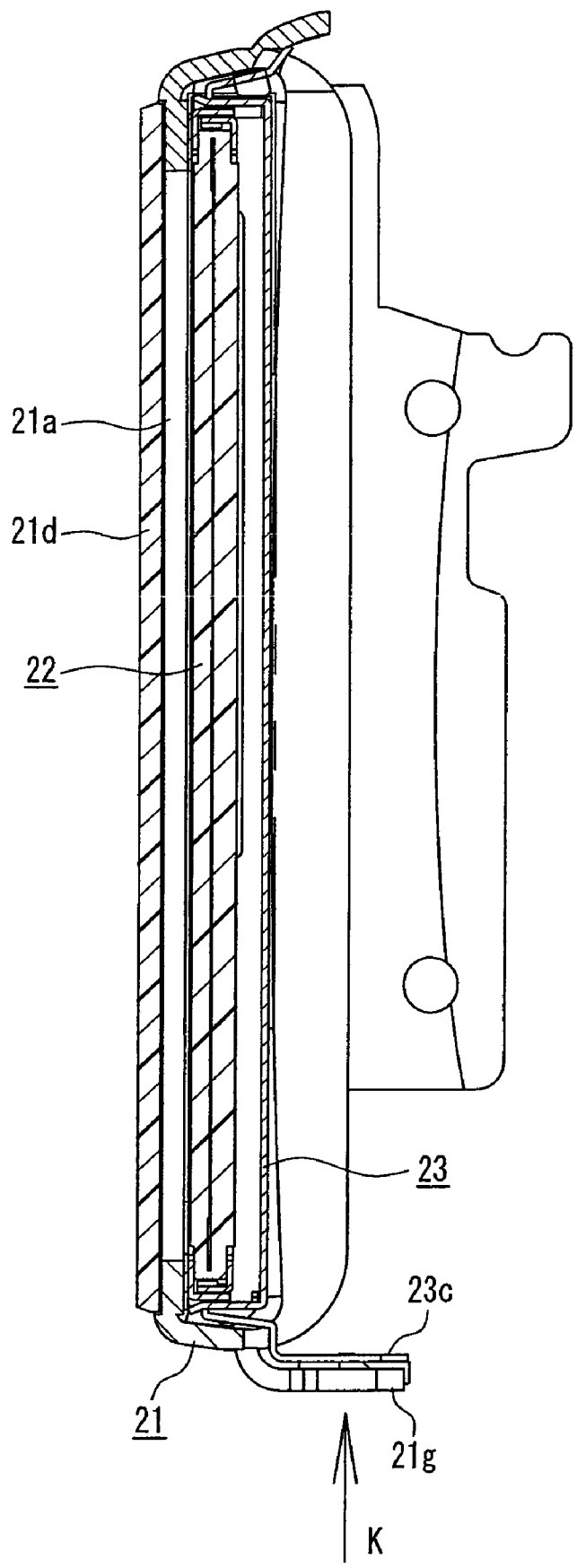
FIG. 14 is a cross-sectional view illustrating the operation of attaching the holding frame to the rear unit.

When attaching the holding frame 23 to which the display unit 22 is attached to the rear unit 21, it is attached according to the procedure shown in FIGS. 12 to 14. FIG. 12 is a cross-sectional view taken along the arrows X-X' in FIG. 9A, and FIGS. 13 and 14 are cross-sectional views taken along the arrows V-V' in FIG. 9A.

First, as shown in FIG. 12, the holding frame 23 is moved in the direction of the arrow E such that the positioning pieces 23b formed on the top portion of the holding frame 23 are engaged with the engaging holes 21b formed in the rear unit 21. At this time, the positioning pieces 23b are supported by the projections 21f formed inside the engaging holes 21b, and thus held by the engaging holes 21b.

Next, as shown in FIG. 13, the holding frame 23 is moved in the direction of the arrow F such that the lower portion of the holding frame 23 is housed in the rear unit 21. At this time, the projections 23k formed on the elastic pieces 23c and 23d as shown in FIG. 8 come in contact with the inner surface of the rear unit 21, while causing the elastic piece 23c to be elastically deformed. In addition, the projection 21c formed on the rib 21g of the rear unit 21 is engaged with the recess 23n formed in the holding frame 23. Furthermore, the projection 21k formed on the rib 21h is engaged with the recess 23p.

Thus, the holding frame 23 can be attached (temporarily fixed) to the inner surface of the rear unit 21, as shown in FIG. 14. FIG. 15 shows a perspective view showing the state in which the holding frame 23 is attached (temporarily fixed) to the inner surface of the rear unit 21.

In the state shown in FIG. 14, the elastic piece 23c is engaged with the projection 21c, while being elastically deformed, so that it is possible to attach the holding frame 23 to the rear unit 21 with reduced play. Furthermore, since the projection 21c and the recess 23n are fitted to each other, the holding frame 23 can be positioned with respect to the rear unit 21.

As shown in FIG. 15, when attaching the cursor key 8 and the button 9 to the rear surface (inner side) of the rear unit 21, a unit formed by joining the cursor key 8 and the button 9 together is prepared in advance. Then, that unit is attached to the rear surface of the rear unit 21. By forming a unit of the cursor key 8 and the button 9 in advance in this way, it is possible to improve the workability of assembling.

As shown in FIG. 15, since the pressing portion 23e shown in FIG. 6 presses against the rib 8g of the cursor key 8 shown in FIG. 10A when the holding frame 23 is attached to the rear unit 21, the cursor key 8 can be held reliably with the rear unit 21.

[3-3. Method for Attaching Rear Unit 21 and Front Unit 24]

Figure 16:
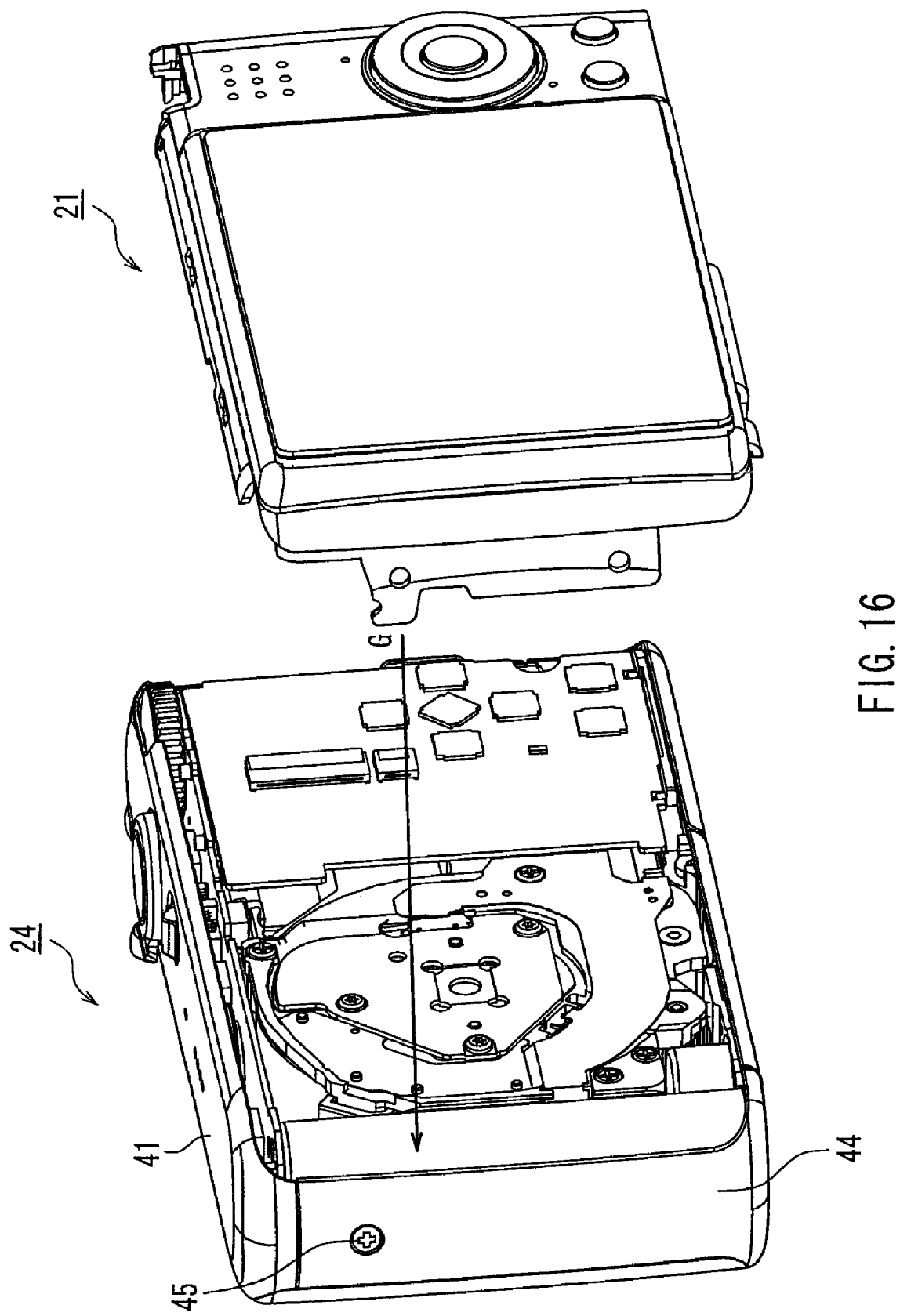
FIG. 16 is a perspective view illustrating the operation of attaching the rear unit to the front unit.

As shown in FIG. 16, the rear unit 21 is attached to the front unit 24 as indicated by the arrow G.

Then, a screw 46 (see FIG. 15) is fastened from the bottom surface side of the image pickup apparatus. That is, an internal thread (not shown) is formed on the bottom surface of the front unit 24, and the screw 46 is screwed with this internal thread. At this time, as shown in FIG. 15, the screw 46 is inserted through the openings of the rear unit 21 and the holding frame 23 and screwed with the front unit 24, so that the rear unit 21 and the holding frame 23 are fastened together with the front unit 24.

Then, the top cover 41 and the side cover 44 are attached, and fixed with the screw 45.

At this time, the engaging holes 21b formed in the top surface of the rear unit 21 and the positioning pieces 23b engaged with the engaging holes 21b are covered by the top cover 41, and therefore are not visible from outside.

[4. Method for Dealing with Entry of Foreign Matter]

When foreign matter such as dust enters between the display unit 22 and the rear unit 21 in the manufacturing process of the above-described image pickup apparatus, the foreign matter is removed as follows.

First, the rear unit 21 is detached from the front unit 24.

Then, in FIG. 14, the elastic pieces 23c and 23d of the holding frame 23 are elastically deformed in the direction of the arrow K by the fingers of the user or a tool, thus releasing the engagement of the projections 21c and 21k (see FIG. 9D) with the recesses 23n and 23p (see FIG. 8).

Then, as shown in FIG. 13, the holding frame 23 is moved in the direction opposite to the arrow F to detach the lower portion of the holding frame 23 from the rear unit 21.

Then, as shown in FIG. 12, the holding frame 23 is moved in the direction opposite to the arrow E to release the positioning pieces 23b (see FIG. 7A) from the engaging holes 21b. Thus, the holding frame 23 readily can be detached from the rear unit 21.

Although the engagement of the elastic piece 23c was released to detach the holding frame 23 in the above-described removal operation, it is also possible to detach the holding frame 23 by releasing the engagement of the elastic piece 23d.

Then, the foreign matter attached to the display area 22a of the display unit 22, or to the transparent plate 21d of the rear unit 21 is removed.

When attaching the holding frame 23 to the rear unit 21 again, it readily can be attached according to the procedure shown in FIGS. 12 to 14, as previously described.

[5. Effects of the Embodiment and Further Considerations]

According to this embodiment, the positioning pieces 23b are engaged with the engaging holes 21b to perform positioning, and the elastic pieces 23c and 23d are engaged with the ribs 21g and 21h while being elastically deformed, and thereby the holding frame 23 is held with the rear unit 21. Thus, the holding frame 23 can be attached and detached from the rear unit 21 easily. Accordingly, the assembling operation of the image pickup apparatus can be facilitated, and the repair operation can be performed easily when foreign matter has entered.

Since the engaging holes 21b formed in the top surface of the rear unit 21 and the dowels 22f engaged with the engaging holes 21b are covered by the top cover 41, the projecting objects (e.g., the dowels 22f) will not protrude to the outside. Therefore, this configuration ensures safety and can improve the quality of the electronic equipment.

Since the rear unit 21, the holding frame 23 and the front unit 24 are made of an electrically conductive material such as metal sheet, it is possible to ground the electrical charge that has built up inside the image pickup apparatus. With this configuration, it is possible to perform electrical grounding, without adding any special component for grounding.

Furthermore, the projection 21c is formed on the rear unit 21. Therefore, when assembling the rear unit 21 and the holding frame 23, the projection 21c slides on the elastic piece 23c, thereby easily stripping off the metal plating film at the sliding portion of these components. Accordingly, it is possible to establish an electrical connection between the rear unit 21 and the holding frame 23, thus performing grounding easily.

Since the rear unit 21, the holding frame 23 and the front unit 24 are screwed together with the screw 46 at their bottom surfaces, it is possible to facilitate the assembling operation, and to reduce the number of components. Moreover, it is possible to establish an electrical connection between the rear unit 21, the holding frame 23 and the front unit 24, thus performing grounding reliably.

Since the rib 8g of the cursor key 8 is pressed by the pressing portion 23e when the rear unit 21 and the holding frame 23 are assembled, it is possible to reduce the number of components for holding the cursor key 8. Moreover, it is possible to fix the cursor key 8 reliably.

During assembly, the cursor key 8 and the button 9 can be fixed temporarily by fitting the pins 8x and 8y to the long holes 9b and 9c to engage the engaging holes 8v and 8w with the projections 9v and 9w, so that assembly can be performed easily.

By forming the notch 22c in the elastic member 22b, there will be no air pressure difference between the air pressure inside the space surrounded by the transparent plate 21d, the display area 22a and the elastic member 22, and the outside air, even if air pressure changes occur in the usage environment. Accordingly, it is possible to prevent deformation of the transparent plate 21d. Although the notch 22c is provided in this embodiment, the elastic member 22b also may be made of a cushioning material having air permeability, without forming the notch 22c. This configuration also can prevent deformation of the transparent plate 21d due to air pressure changes in the usage environment.

Figure 17:
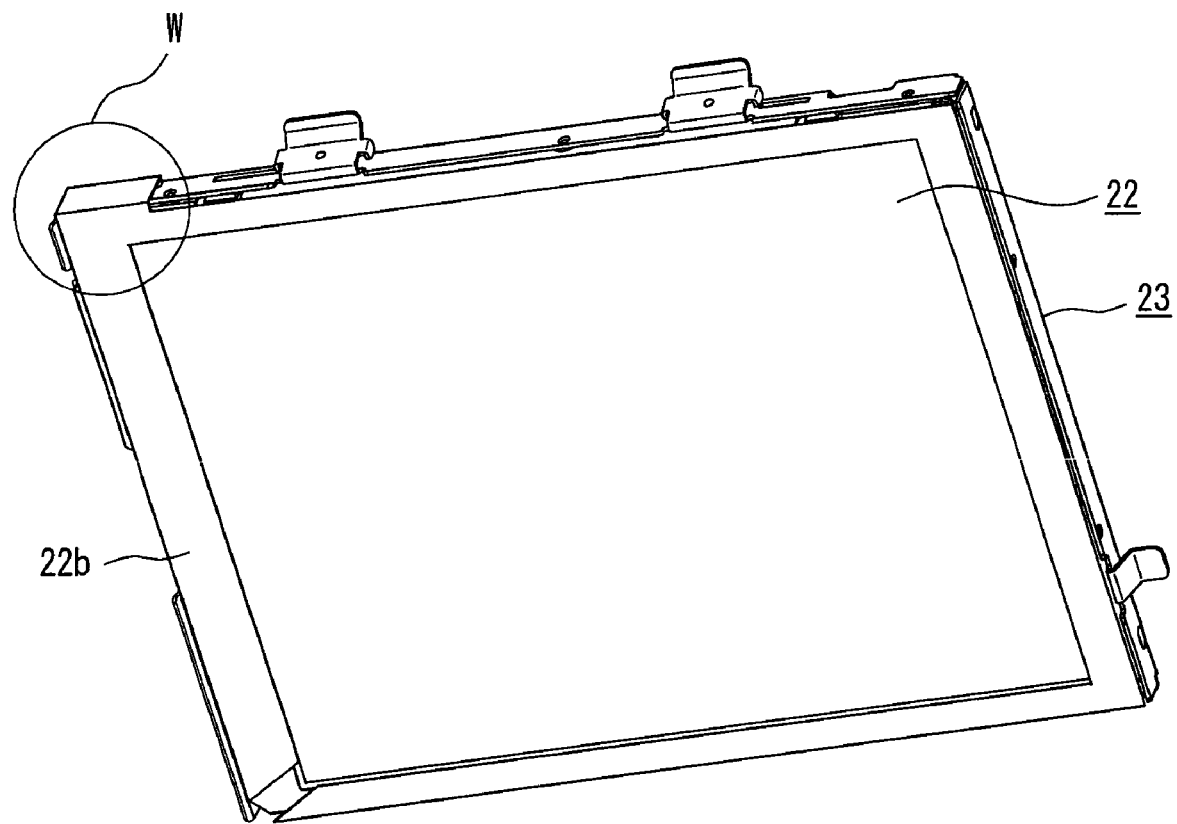
FIG. 17 is a perspective view showing the configuration of the display unit held by the holding frame.
Figure 18:
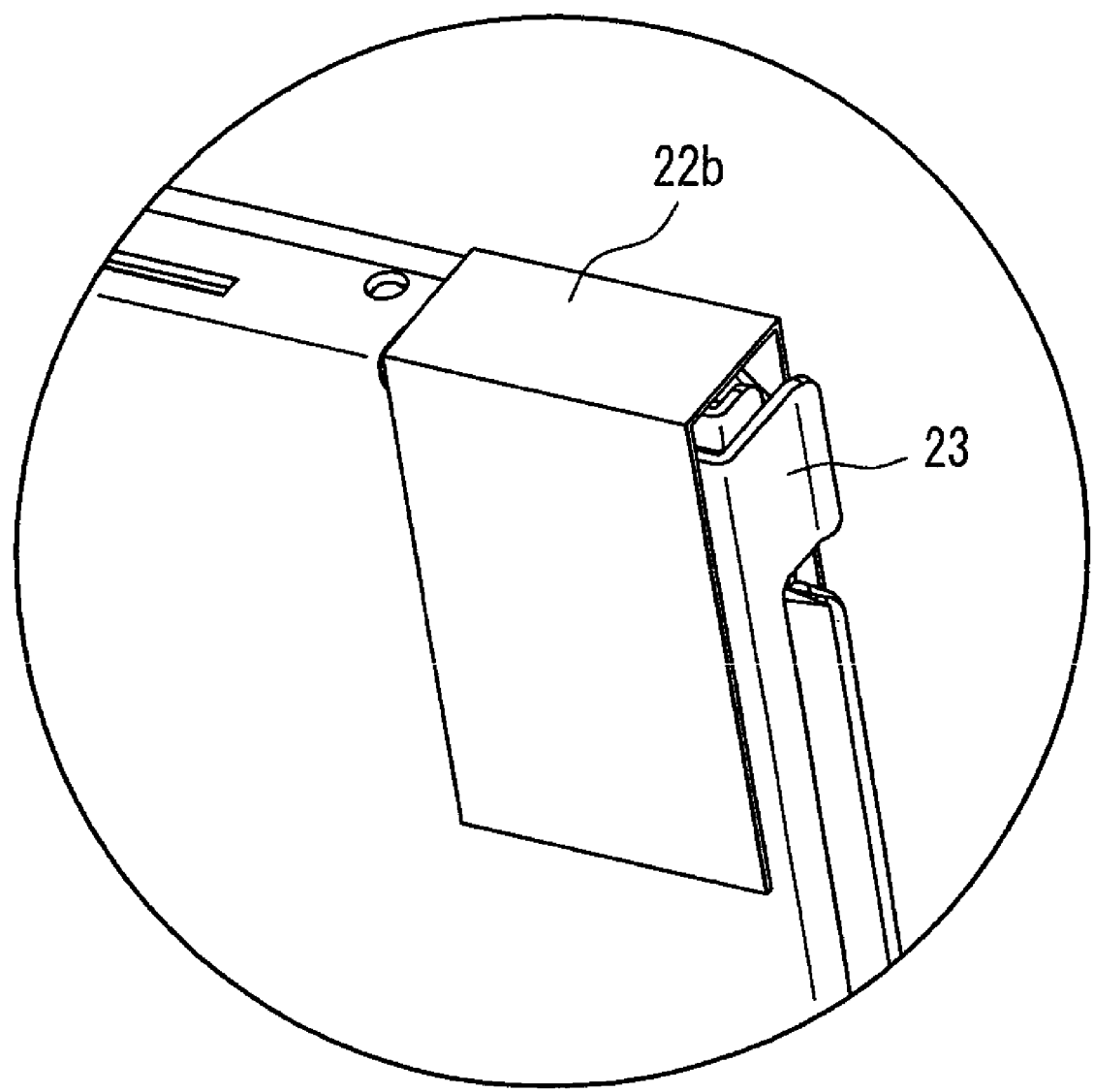
FIG. 18 is a perspective view showing a relevant part of the portion W in FIG. 17.

Furthermore, by forming a folding portion 22g at the elastic member 22b and attaching the folding portion 22g to the area reaching the rear surface side of the display panel 22d, it is possible to prevent entry of foreign matter such as dust into the display unit 22. More specifically, the state in which the display unit 22 is attached to the holding frame 23 is shown in FIG. 17. The elastic member 22b attached to the display unit 22 is provided with the folding portion 22g that partially extends outward. As the area indicated by W in FIG. 17, the folding portion 22g is folded along the outer shape of the display unit 22 to the rear surface side thereof and attached there. FIG. 18 is an enlarged perspective view showing the area indicated by W in FIG. 17, taken from the rear surface side of the display unit 22. With this configuration, it is possible to prevent entry of foreign matter such as dust into the display unit 22.

In this embodiment, the image pickup apparatus was described as an example of the electronic equipment of the present invention. However, the electronic equipment of the present invention may be any electronic equipment on which at least a display element such as a liquid crystal display panel is mounted. Examples thereof include an image pickup apparatus such as a digital still camera, a mobile phone, a PDA (Personal Digital Assistant) and a palm-sized game console.

The electronic equipment of the present invention is useful for equipment including a display element.

APPENDIX 1

Electronic equipment of the present invention includes: a display element; a holding frame that holds the display element; an elastic piece that is provided at the holding frame and can be elastically deformed in a substantially planar direction of a display surface of the display element; and a first cover that holds the holding frame and comprising an opening formed to allow the display element to be visible from outside, wherein the holding frame is held by the first cover by elastically deforming the elastic piece and engaging it with the inner surface of the first cover.

According to this configuration, the holding frame is held with the first cover using the above-described configuration, without using any fastening means such as a screw, so that it is possible to readily attach and detach the display element such as a liquid crystal panel from the first cover. Accordingly, it is possible to simplify the assembling process and the repair operation.

In the above-described configuration, the display portion 7 is one example of the display element. The holding frame 23 is one example of the holding frame. The opening 21a is one example of the opening. The rear cover 43 is one example of the first cover.

APPENDIX 2

Electronic equipment of the present invention includes: a display element; a holding frame including a housing portion in which the display element is housed, a first elastic piece disposed near the housing portion, and a second elastic piece disposed at a position opposed to the first elastic piece near the housing portion and including a recess; and a first cover including an opening formed to allow the display surface of the display element to be visible from outside, an engaging hole into which the first elastic piece is inserted, and a projection by which the second elastic piece is held, wherein the holding frame holding the display element and the first cover are assembled by engaging the first elastic piece with the engaging hole by insertion, and fitting the recess to the projection.

With the above-described configuration, the first elastic piece is engaged with the engaging hole to perform positioning, and the second elastic piece is engaged with the projection formed on the first cover while being elastically deformed, and thereby the holding frame is held with the first cover without using any fastening means such as screws. Thus, it is possible to readily attach and detach the display element such as a liquid crystal panel from the first cover. Accordingly, it is possible to simplify the assembling process and the repair operation. Furthermore, the holding frame and the first cover are engaged with each other, while being partly positioned, so that it is possible to perform positioning easily when attaching the holding frame to the first cover.

In the above-described configuration, the housing portion 23a is one example of the housing portion, and the positioning piece 23b is one example of the first elastic piece. The recess 23n is one example of the recess. The elastic piece 23c is one example of the second elastic piece. The opening 21a is one example of the opening. The engaging hole 21b is one example of the engaging hole. The projection 21c is one example of the projection.

APPENDIX 3

The electronic equipment of the present invention may further include a third cover covering the engaging hole and the first elastic piece that are engaged with each other. Since the projection will not protrude to the outside, this configuration ensures safety and can improve the quality of the electronic equipment.

In above-described configuration, the top cover 41 is one example of the third cover.

APPENDIX 4

According to the electronic equipment of the present invention, the holding frame and the first cover may be made of an electrically conductive material, and the engaging hole and the first elastic piece may be in electrical contact. With this configuration, it is possible to ground the electrical charge that has built up inside the image pickup apparatus, and to perform electrical grounding, without adding any special component for grounding.

APPENDIX 5

According to the electronic equipment of the present invention, a projection that positions the first elastic piece may be formed on the engaging hole. With this configuration, it is possible to position the first cover and the holding frame reliably. In addition, when assembling the first cover and the holding frame, the projection slides on the elastic piece, thereby easily stripping off the metal plating film at the sliding portion of these components. Accordingly, it is possible to establish an electrical connection between the front cover and the holding frame reliably, thus performing grounding reliably.

In the above-described configuration, the projection 21f is one example of the projection.

APPENDIX 6

The electronic equipment of the present invention may further include a second cover fixed to the first cover and covering the rear surface side of the display element, wherein the holding frame, the first cover and the second cover are screwed together with a screw. With this configuration, it is possible to facilitate the assembling operation, and to reduce the number of components.

APPENDIX 7

The electronic equipment of the present invention may include an elastic member disposed at the periphery of an effective display area of the display element on the surface side, and disposed at a position sandwiched between the display element and the first cover when the holding frame and the first cover are assembled, wherein the elastic member is provided with a notch that allows the effective display area to be in communication with outside air. With this configuration, when air pressure changes occur in the usage environment, the air pressure inside the effective display area changes accordingly, making it possible to prevent deformation of the transparent plate.

In the above-described configuration, the elastic member 22b is one example of the elastic member.

APPENDIX 8

According to the electronic equipment of the present invention, at least a portion of the elastic member may be continuously attached from the surface side to the rear surface side of the display element. With this configuration, it is possible to prevent entry of foreign matter such as dust into the display unit 22.

APPENDIX 9

The electronic equipment of the present invention may include an elastic member disposed at the periphery of an effective display area of the display element on the surface side, and disposed at a position sandwiched between the display element and the first cover when the holding frame and the first cover are assembled, wherein the elastic member is made of an air-permeable material. With this configuration, it is not necessary to form a notch in the elastic member, so that it is possible to prevent deformation of the transparent plate due to air pressure changes, using a simple configuration.

APPENDIX 10

Electronic equipment of the present invention includes: a display element; a holding frame that holds the display element and including an elastic piece that can be elastically deformed in a substantially planar direction of a display surface of the display element; a first cover that holds the holding frame and including an opening that allows the display element to be visible from outside; a second cover fixed to the first cover and covering the rear surface side of the display element; and an operating portion fixed to the rear surface of the first cover and disposed such that an area thereof that is operated by a user is exposed on the surface of the first cover, wherein a portion of the operating portion is sandwiched between the rear surface of the front cover and the holding frame.

With this configuration, it is possible to position and hold a portion of the operating portion by attaching the holding frame to the rear surface of the front cover, so that it is possible to improve the ease of assembly when assembling the operating portion to the front cover.

In the above-described configuration, the cursor key 8, the button 9, and the buttons 10 are one example of the operating portion.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. Electronic equipment comprising:
a display element;
a holding frame that holds the display element;
an elastic piece that is provided at the holding frame and can be elastically deformed in a substantially planar direction of a display surface of the display element; and
a first cover that holds the holding frame and comprises an opening formed to allow the display element to be visible from outside,
wherein the holding frame is held with the first cover by engagement of the elastic piece with the inner surface of the first cover while elastically deforming the elastic piece.

2. Electronic equipment comprising:
a display element;
a holding frame comprising a housing portion in which the display element is housed, a first elastic piece disposed near the housing portion, and a second elastic piece disposed at a position opposed to the first elastic piece near the housing portion and including a recess; and
a first cover comprising an opening formed to allow the display surface of the display element to be visible from outside, an engaging hole into which the first elastic piece is inserted, and a projection by which the second elastic piece is held,
wherein the holding frame holding the display element and the first cover are assembled by engaging the first elastic piece with the engaging hole by insertion, and fitting the recess to the projection.

3. The electronic equipment according to claim 2, further comprising a third cover that covers the engaging hole and the first elastic piece that are engaged with each other.

4. The electronic equipment according to claim 2, wherein the holding frame and the first cover are made of an electrically conductive material, and the engaging hole and the first elastic piece are in electrical contact.

5. The electronic equipment according to claim 4, wherein a projection that positions the first elastic piece is formed on the engaging hole.

6. The electronic equipment according to claim 2, further comprising a second cover fixed to the first cover and covering the rear surface side of the display element,
wherein the holding frame, the first cover and the second cover are screwed together with a screw.

7. The electronic equipment according to claim 2, comprising an elastic member disposed at the periphery of an effective display area of the display element on the surface side, and disposed at a position sandwiched between the display element and the first cover when the holding frame and the first cover are assembled,
wherein the elastic member is provided with a notch that allows the effective display area to be in communication with outside air.

8. The electronic equipment according to claim 7, wherein at least a portion of the elastic member is continuously attached from the surface side to the rear surface side of the display element.

9. The electronic equipment according to claim 2, comprising an elastic member disposed at the periphery of an effective display area of the display element on the surface side, and disposed at a position sandwiched between the display element and the first cover when the holding frame and the first cover are assembled, wherein the elastic member is made of an air-permeable material.

10. Electronic equipment comprising:
a display element;
a holding frame that holds the display element and comprising an elastic piece that can be elastically deformed in a substantially planar direction of a display surface of the display element;
a first cover that holds the holding frame and comprises an opening that allows the display element to be visible from outside;
a second cover fixed to the first cover and covering the rear surface side of the display element; and
an operating portion fixed to the rear surface of the first cover and disposed such that an area thereof that is operated by a user is exposed on the surface of the first cover,
wherein the holding frame is held with the first cover by engagement of the elastic piece with the inner surface of the first cover while elastically deforming the elastic piece, and
a portion of the operating portion is sandwiched between the rear surface of the front cover and the holding frame.

* * * * *